(12) United States Patent
Oh et al.

(10) Patent No.: US 11,463,671 B2
(45) Date of Patent: Oct. 4, 2022

(54) VIDEO TRANSMITTING METHOD, VIDEO TRANSMITTING DEVICE, VIDEO RECEIVING METHOD AND VIDEO RECEIVING DEVICE

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/259,077

(22) PCT Filed: Jul. 3, 2019

(86) PCT No.: PCT/KR2019/008122
§ 371 (c)(1),
(2) Date: Jan. 8, 2021

(87) PCT Pub. No.: WO2020/013513
PCT Pub. Date: Jan. 16, 2020

(65) Prior Publication Data
US 2021/0274146 A1    Sep. 2, 2021

Related U.S. Application Data

(60) Provisional application No. 62/695,812, filed on Jul. 9, 2018.

(51) Int. Cl.
*H04N 13/161*    (2018.01)
*H04N 13/178*    (2018.01)
(Continued)

(52) U.S. Cl.
CPC ......... *H04N 13/161* (2018.05); *H04N 13/178* (2018.05); *H04N 13/194* (2018.05)

(58) Field of Classification Search
None
See application file for complete search history.

(56) References Cited

U.S. PATENT DOCUMENTS

| 2012/0019670 A1* | 1/2012 | Chang | H04N 9/3194 |
| | | | 348/189 |
| 2013/0135431 A1* | 5/2013 | Chen | H04N 13/161 |
| | | | 348/42 |

(Continued)

FOREIGN PATENT DOCUMENTS

| KR | 1020170095035 | 8/2017 |
| KR | 1020180016461 | 2/2018 |

(Continued)

OTHER PUBLICATIONS

PCT International Search Report and Written Opinion in International Appln. No. PCT/KR2019/008122, dated Oct. 16, 2019, 22 pages (with English translation).

*Primary Examiner* — Christopher Braniff
(74) *Attorney, Agent, or Firm* — Fish & Richardson P.C.

(57) ABSTRACT

A video transmitting device according to embodiments of the present invention can comprise a pre-processor for processing video data, an encoder for encoding the pre-processed video data and a transmitting unit for transmitting the encoded video data. Additionally, the video transmitting device further comprises a projector for generating a picture and a projection parameter related to the picture by projecting the video data, and the pre-processor can view-select video data for a specific view from among the video data. Furthermore, the pre-processor of the video transmitting device can pack the video data into specific video data by view-analyzing the video data.

7 Claims, 36 Drawing Sheets

(51) Int. Cl.
*H04N 13/194* (2018.01)
*G06T 15/20* (2011.01)

(56) References Cited

U.S. PATENT DOCUMENTS

2015/0339843 A1    11/2015  Unger et al.
2018/0276826 A1*   9/2018   Van Der Auwera ..........................
                                                                H04N 19/182

FOREIGN PATENT DOCUMENTS

KR    1020180040507    4/2018
WO    WO2017204491     11/2017

* cited by examiner

FIG. 8

```
.....
        <Default metadata>
unsigned    int(8)      vr_geometry;
unsigned    int(8)      projection_schme;
        <Stereoscopic related metadata>
unsigned    int(1)      is_stereoscopic;
unsigned    int(3)      stereo_mode;
        <Initial View related metadata>
signed      int(8)      initial_view_yaw_degree;
signed      int(8)      initial_view_pitch_degree;
signed      int(8)      initial_view_roll_degree;
        <ROI related metadata>
unsigned int(1)             2d_roi_range_flag;
unsigned int(1)             3d_roi_range_flag;
if (2d_roi_region_flag ==1) {
    unsigned int(16) min_top_left_x;
    unsigned int(16) max_top_left_x;
    unsigned int(16) min_top_left_y;
    unsigned int(16) max_top_left_y;
    unsigned int(16) min_width;
    unsigned int(16) max_width;
    unsigned int(16) min_height;
    unsigned int(16) max_height;
    unsigned int(16) min_x;
    unsigned int(16) max_x;
    unsigned int(16) min_y;
    unsigned int(16) max_y;
}
if (3d_roi_region_flag ==1) {
    unsigned int(16) min_yaw;
    unsigned int(16) max_yaw;
    unsigned int(16) min_pitch;
    unsigned int(16) max_pitch;
    unsigned int(16) min_roll;
    unsigned int(16) max_roll;
    unsigned int(16) min_field_of_view;
    unsigned int(16) max_field_of_view;
}
        <Field Of View related metadata>
unsigned int(1)             content_fov_flag;
if (content_fov_flag == 1) {
    unsigned int(16)        content_fov;
}
        <Cropped Region related metadata>
unsigned int(1)             is_cropped_region;
if(is_cropped_region == 1) {
    unsigned int(16)        cr_region_left_top_x;
    unsigned int(16)        cr_region_left_top_y;
    unsigned int(16)        cr_region_width;
    unsigned int(16)        cr_region_height;
}
.....
```

(a)          (b)          (c)

VIDEO TRANSMITTING METHOD, VIDEO TRANSMITTING DEVICE, VIDEO RECEIVING METHOD AND VIDEO RECEIVING DEVICE

CROSS-REFERENCE TO RELATED APPLICATIONS

This application is a National Stage application under 35 U.S.C. § 371 of International Application No. PCT/KR2019/008122, filed on Jul. 3, 2019, which claims the benefit of U.S. Provisional Application No. 62/695,812, filed on Jul. 9, 2018. The disclosures of the prior applications are incorporated by reference in their entirety.

TECHNICAL FIELD

The present disclosure relates to a video transmission method, a video transmission device, a video reception method, and a video reception device.

BACKGROUND ART

A virtual reality (VR) system provides a user with a sense of being in an electronically projected environment. The system for providing VR may be further improved to provide higher quality images and stereophonic sound. A VR system may allow a user to interactively consume VR content.

DISCLOSURE

Technical Problem

The VR system needs to be improved in order to more efficiently provide a VR environment to users. To this end, data transmission efficiency for transmitting a large amount of data such as VR content, robustness between transmission and reception networks, network flexibility in consideration of mobile reception devices, and methods for efficient playback and signaling need to be proposed.

In addition, since general TTML (Timed Text Markup Language)-based subtitles or bitmap-based subtitles are not produced in consideration of 360 video, subtitle-related features and subtitle-related signaling information need to be further extended to be suitable for a use case of VR service in order to provide subtitles suitable for 360 video.

Technical Solution

In accordance with the object of the present disclosure, provided herein are a video transmission method, a video transmission device, a video reception method, and a video reception device.

A video transmission device according to embodiments of the present disclosure may include a pre-processor configured to process video data, an encoder configured to encode the pre-processed video data, and a transmitter configured to transmit the encoded video data.

The video transmission device may further include a projector configured to project the video data to generate a picture and a projection parameter related to the picture, wherein the pre-processor may view-select video data for a specific view from the video data.

In addition, the pre-processor of the video transmission device may view-analyze the video data and pack the video data into specific video data.

Advantageous Effects

The present disclosure may provide 3 DoF+ video including an optimal combination.

The present disclosure may provide a 3 DoF+ video with redundancy minimized.

The present disclosure may provide a 3 DoF+ video transmission and reception system reflecting real-time motion.

The present disclosure may provide a device configured to reconstruct a specific viewing position image for low-latency transmission/reception.

The present disclosure may provide a device configured to generate and process an image for a viewing position optimized for a user viewport.

The present disclosure may provide a view that is robust to encoding errors and/or reconstruction errors.

The present disclosure may generate an image optimized for a user viewport, thereby reducing the motion-to-photon delay.

The present disclosure may provide a device that may be integrated with a renderer for low delay.

The present disclosure may reflect real-time motion, minimize receiver load and latency, and generate a multi-viewing position 3 DoF+ image.

BRIEF DESCRIPTION OF DRAWINGS

FIG. 8 illustrates 360-degree video related metadata according to an embodiment of the present disclosure.

DETAILED DESCRIPTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

Figure 1:
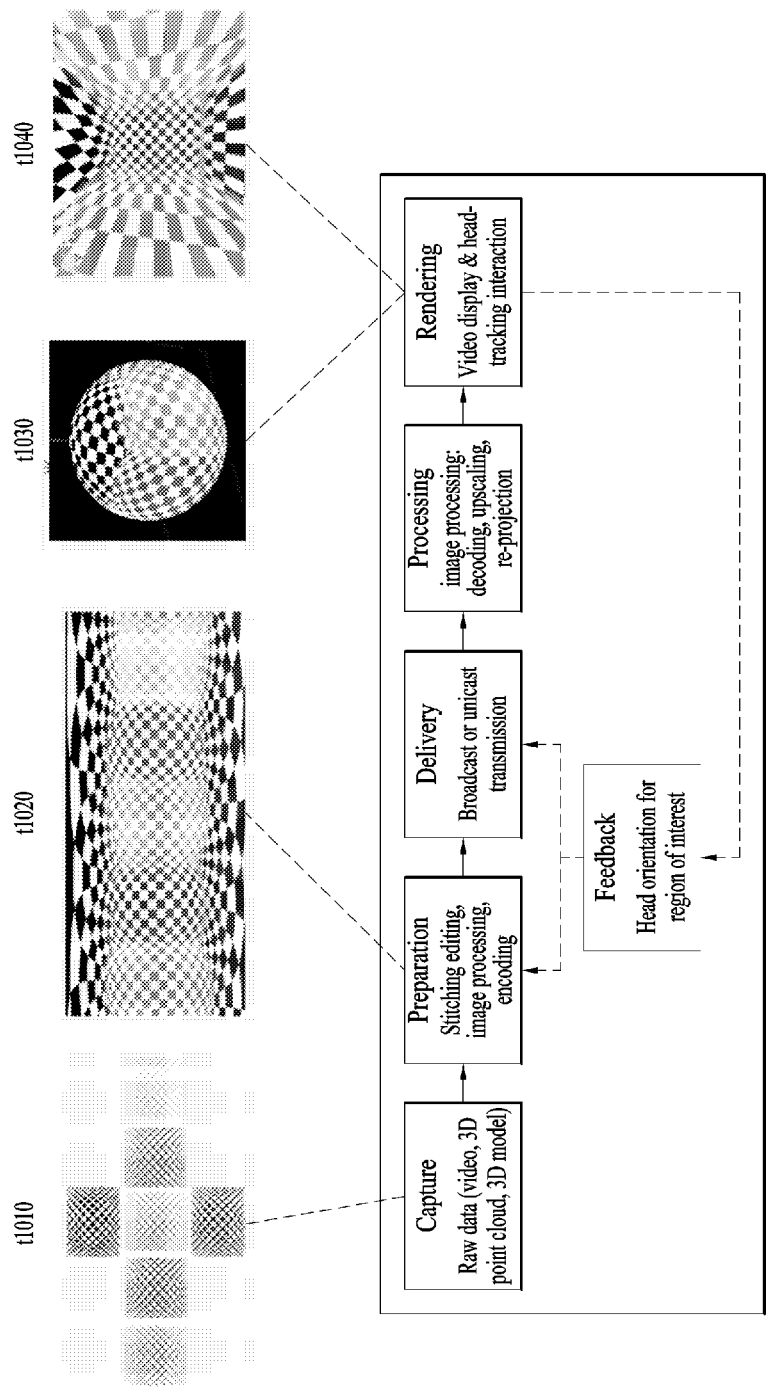
FIG. 1 illustrates an architecture for providing 360 video according to the present disclosure.

FIG. 1 illustrates an architecture for providing 360-degree video according to the present disclosure.

The present disclosure provides a method for providing 360-degree content to provide virtual reality (VR) to users. VR refers to a technique or an environment for replicating an actual or virtual environment. VR artificially provides sensuous experiences to users, and users can experience electronically projected environments.

360-degree content refers to convent for realizing and providing VR and may include 360-degree video and/or 360-degree audio. 360-degree video may refer to video or image content which is necessary to provide VR and is captured or reproduced in all directions (360 degrees). 360-degree video can refer to video or image represented on 3D spaces in various forms according to 3D models. For example, 360-degree video can be represented on a spherical plane. 360-degree audio is audio content for providing VR and can refer to spatial audio content which can be recognized as content having an audio generation source located in a specific space. 360-degree content can be generated, processed and transmitted to users, and users can consume VR experiences using the 360-degree content. 360-degree content/video/image/audio may be referred to as 360 content/video/image/audio, omitting the term "degree" representing a unit, or as VR content/video/image/audio.

The present disclosure proposes a method for effectively providing 360 video. To provide 360 video, first, 360 video can be captured using one or more cameras. The captured 360 video is transmitted through a series of processes, and a reception side can process received data into the original 360 video and render the 360 video. Thus, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 can be generated through the capture process. Each plane of the shown image/video data t1010 can refer to an image/video for each view. The captured images/videos may be called raw data. In the capture process, metadata related to capture can be generated.

For the capture process, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions can be obtained by dividing the 2D image equally or arbitrarily according to an embodiment. Regions may be divided according to a projection scheme according to an embodiment. The region-wise packing process is an optional process and thus may be omitted from the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, the this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or region of interest (ROI) of the video data projected on the 2D image may be generated.

The transmission process may be a process of processing and transmitting the image/video data and metadata which have pass through the preparation process. For transmission, processing according to any transmission protocol may be performed. The data that has been processed for transmission can be delivered over a broadcast network and/or broadband. The data may be delivered to the reception side in an on-demand manner. The reception side can receive the data through various paths.

The processing process may refer to a process of decoding the received data and re-projecting the projected image/video data on a 3D model. In this process, the image/video data projected on the 2D image can be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may take a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, and the like may be delivered to the transmission side in the feedback process. According to an embodiment, a user can interact with content realized in a VR environment. In this case, information related to the interaction may be delivered to the transmission side or a service provider during the feedback process. According to an embodiment, the feedback process may not be performed.

The head orientation information may refer to information about the location, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the reception side and the analysis result may be delivered to the transmission side through a feedback channel. a device such as a VR display can extract a viewport region on the basis of the location/direction of a user's head, vertical or horizontal FOV supported by the device.

According to an embodiment, the aforementioned feedback information may be consumed at the reception side as well as being delivered to the transmission side. That is, decoding, re-projection and rendering processes of the reception side can be performed using the aforementioned feedback information. For example, only 360 video for the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and can refer to a center point of a viewport region. That is, a viewport is a region based on a view, and the size and form of the region can be determined by the field of view (FOV), which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
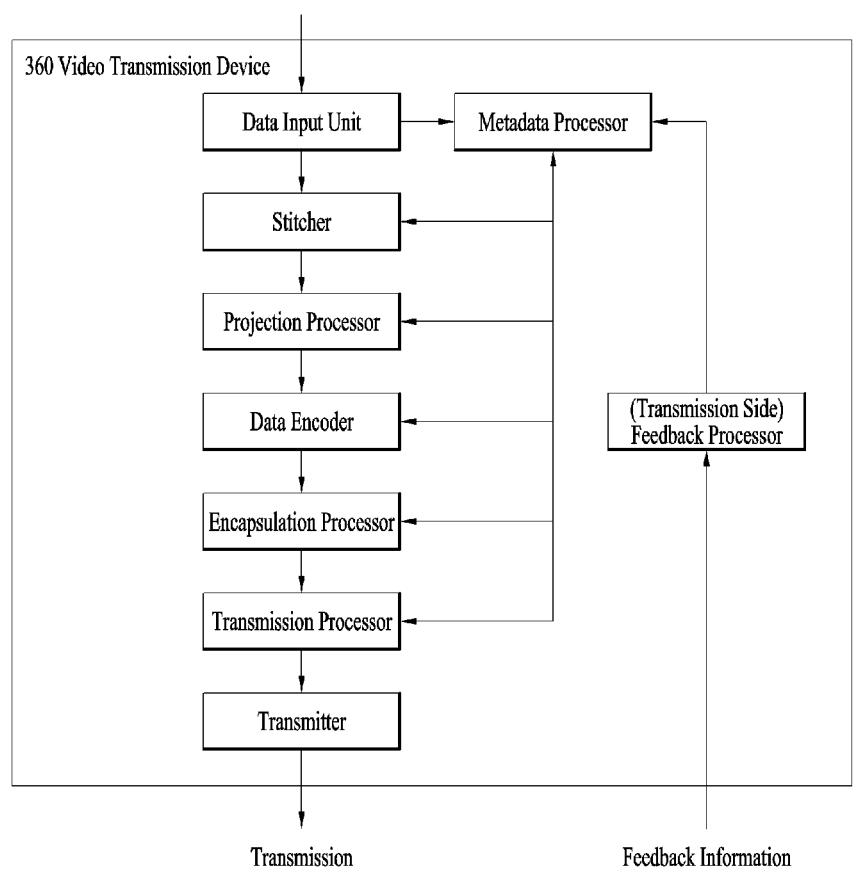
FIG. 2 illustrates a 360-degree video transmission device according to one aspect of the present disclosure.

FIG. 2 illustrates a 360-degree video transmission device according to one aspect of the present disclosure.

According to one aspect, the present disclosure may relate to a 360 video transmission device. The 360 video transmission device according to the present disclosure may perform operations related to the above-described preparation process to the transmission process. The 360 video transmission device according to the present disclosure may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher may deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor may be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which may be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor may deliver acquired or generated metadata to internal elements of the 360 video transmission device as necessary. The metadata processor may deliver the 360 video related metadata to the data encoder, the encapsulation processor and/or the transmission processor such that the metadata may be transmitted to the reception side.

The data encoder may encode the 360 video data projected on the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata may be included in boxes of various levels in an ISOBMFF file format or included as data in an additional track in a file. The encapsulation processor may encapsulate the 360 video related metadata into a file according to an embodiment. The transmission processor may perform processing for transmission on the 360 video data encapsulated in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmitter may transmit the processed 360 video data and/or the 360 video related metadata over a broadcast network and/or broadband. The transmitter may include an element for transmission over a broadcast network and an element for transmission over a broadband.

According to an embodiment of the 360 video transmission device according to the present disclosure, the 360 video transmission device may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the 360 video transmission device according to the present disclosure, the 360 video transmission device may further include a transmitter feedback processor and/or a network interface (not shown) as internal/external elements. The network interface may receive feedback information from a 360 video reception device according to the present disclosure and deliver the feedback information to the transmitter feedback processor. The transmitter feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in processing of 360 video data.

According to another embodiment of the 360 video transmission device according to the present disclosure, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission device according to the present disclosure, the data encoder may perform encoding differently on respective regions. The data encoder may encode a specific region with high quality and encode other regions with low quality. The feedback processor at the transmission side may deliver the feedback information received from a 360 video reception device to the data encoder such that the data encoder may use encoding methods differentiated for regions. For example, the transmitter feedback processor may deliver viewport information received from a reception side to the data encoder. The data encoder may encode regions including a region indicated by the viewport information with higher quality (UHD) than other regions.

According to another embodiment of the 360 video transmission device according to the present disclosure, the transmission processor may perform processing for transmission differently on respective regions. The transmission processor may apply different transmission parameters (modulation orders, code rates, etc.) to regions such that data delivered to the regions have different robustnesses.

Here, the transmitter feedback processor may deliver the feedback information received from the 360 video reception device to the transmission processor such that the transmission processor may perform transmission processing differentiated for respective regions. For example, the transmitter feedback processor may deliver viewport information received from the reception side to the transmission processor. The transmission processor may perform transmission processing on regions including a region indicated by the viewport information such that the regions have higher robustness than other regions.

The internal/external elements of the 360 video transmission device according to the present disclosure may be hardware elements realized by hardware. According to an embodiment, the internal/external elements may be modified, omitted, replaced by other elements or integrated with other elements. According to an embodiment, additional elements may be added to the 360 video transmission device.

Figure 3:
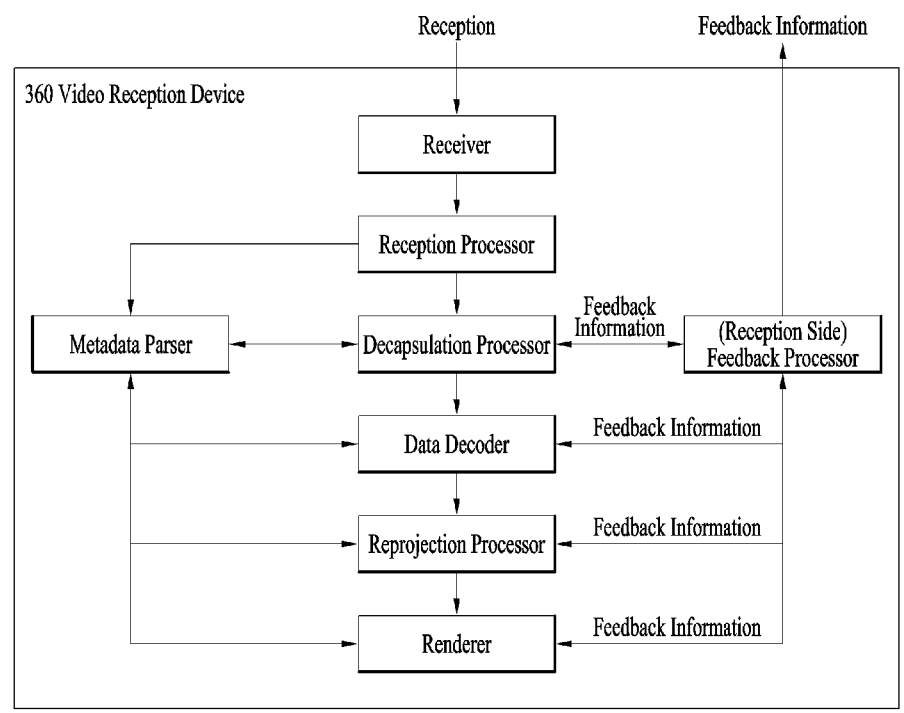
FIG. 3 illustrates a 360-degree video reception device according to another aspect of the present disclosure.

FIG. 3 illustrates a 360-degree video reception device according to another aspect of the present disclosure.

According to another aspect, the present disclosure may relate to a 360 video reception device. The 360 video reception device according to the present disclosure may perform operations related to the above-described processing process and/or the rendering process. The 360 video reception device according to the present disclosure may include a reception unit, a reception processor, a decapsulation processor, a data decoder, a metadata parser, a receiver feedback processor, a re-projection processor and/or a renderer as internal/external elements.

The reception unit may receive 360 video data transmitted from the 360 video transmission device according to the present disclosure. The reception unit may receive the 360 video data through a broadcast network or a broadband according to a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms according to used 3D modes. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated to perform both the processes in the renderer. According to an embodiment, the renderer may render only a region viewed by a user according to view information of the user.

A user may view part of the rendered 360 video through a VR display. The VR display is a device for reproducing 360 video and may be included in the 360 video reception device (tethered) or connected to the 360 video reception device as a separate device (un-tethered).

According to an embodiment of the 360 video reception device according to the present disclosure, the 360 video reception device may further include a (receiver) feedback processor and/or a network interface (not shown) as internal/external elements. The receiver feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the receiver feedback processor and transmit the same to the 360 video transmission device.

As described above, the feedback information may be used by the reception side in addition to being delivered to the transmission side. The receiver feedback processor may deliver the acquired feedback information to internal elements of the 360 video reception device such that the feedback information is reflected in a rendering process. The receiver feedback processor may deliver the feedback information to the renderer, the re-projection processor, the data decoder and/or the decapsulation processor. For example, the renderer may preferentially render a region viewed by a user using the feedback information. In addition, the decapsulation processor and the data decoder may preferentially decapsulate and decode a region viewed by the user or a region to be viewed by the user.

The internal/external elements of the 360 video reception device according to the present disclosure may be hardware elements realized by hardware. According to an embodiment, the internal/external elements may be modified, omitted, replaced by other elements or integrated with other elements. According to an embodiment, additional elements may be added to the 360 video reception device.

Another aspect of the present disclosure may relate to a method of transmitting 360 video and a method of receiving 360 video. The methods of transmitting/receiving 360 video according to the present disclosure may be performed by the above-described 360 video transmission/reception devices or embodiments thereof.

The aforementioned embodiments of the 360 video transmission/reception devices and embodiments of the internal/external elements thereof may be combined. For example, embodiments of the projection processor and embodiments of the data encoder may be combined to create as many embodiments of the 360 video transmission device as the number of the embodiments. The combined embodiments are also included in the scope of the present disclosure.

Figure 4:
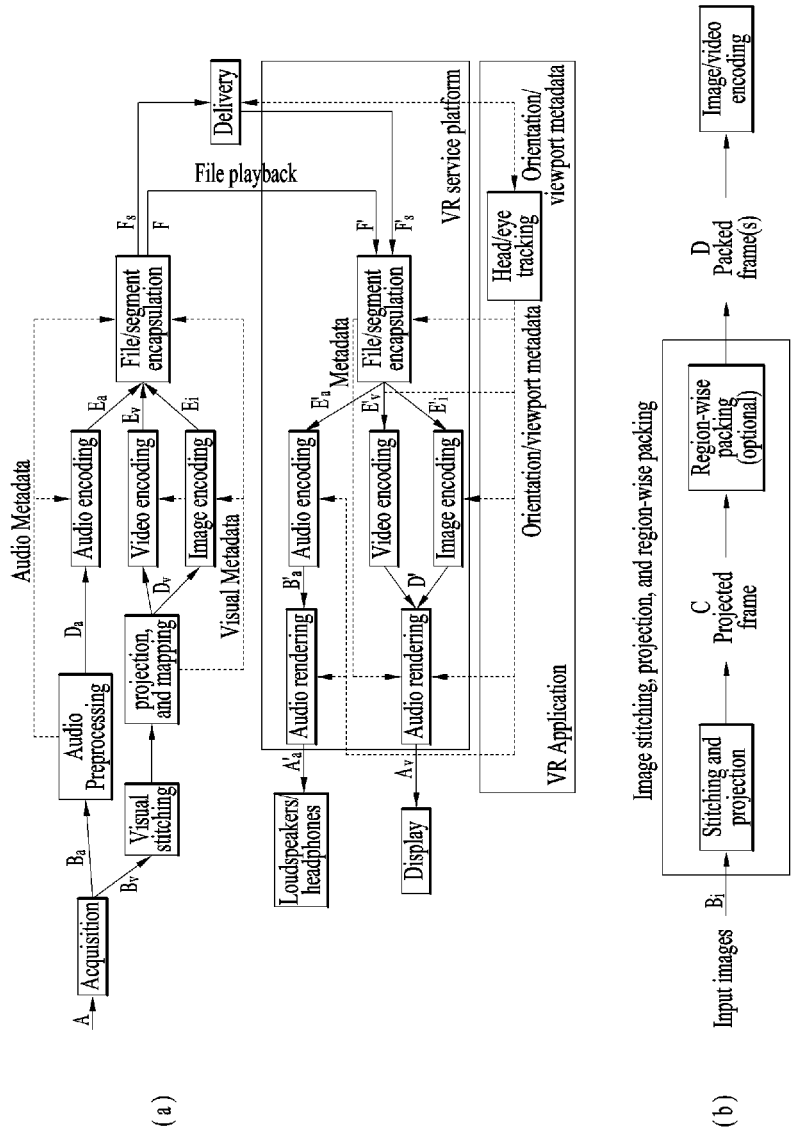
FIG. 4 illustrates a 360-degree video transmission device/360-degree video reception device according to another embodiment of the present disclosure.

FIG. 4 illustrates a 360-degree video transmission device/360-degree video reception device according to another embodiment of the present disclosure.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. In these processes, audio related metadata may be generated, and the encoded audio and audio related metadata may be subjected to processing for transmission (file/segment encapsulation).

The 360 video data may pass through the aforementioned processes. The stitcher of the 360 video transmission device may stitch the 360 video data (visual stitching). This process may be omitted and performed at the reception side according to an embodiment. The projection processor of the 360 video transmission device may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the reception side.

The 2D image may also be called a projected frame (C). Region-wise packing may be optionally performed on the 2D image. When region-wise packing is performed, the locations, forms and sizes of regions may be indicated such that the regions on the 2D image may be mapped on a packed frame (D). When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video stream or a file format and delivered. The metadata may be used for encoding, file format encapsulation, processing for transmission, etc.

The 360 audio/video data may pass through processing for transmission according to the transmission protocol and then may be transmitted. The aforementioned 360 video reception device may receive the 360 audio/video data over a broadcast network or broadband.

In (a), a VR service platform may correspond to an embodiment of the aforementioned 360 video reception device. In (a), loudspeakers/headphones, display and head/eye tracking components are performed by an external device or a VR application of the 360 video reception device. According to an embodiment, the 360 video reception device may include all of these components. According to an embodiment, the head/eye tracking component may correspond to the aforementioned receiver feedback processor.

The 360 video reception device may perform processing for reception (file/segment decapsulation) on the 360 audio/video data. The 360 audio data may be subjected to audio decoding and audio rendering and provided to a user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking component may acquire and process head orientation information, gaze information and viewport information of a user. This has been described above.

A VR application which communicates with the aforementioned processes of the reception side may be present at the reception side.

Figure 5:
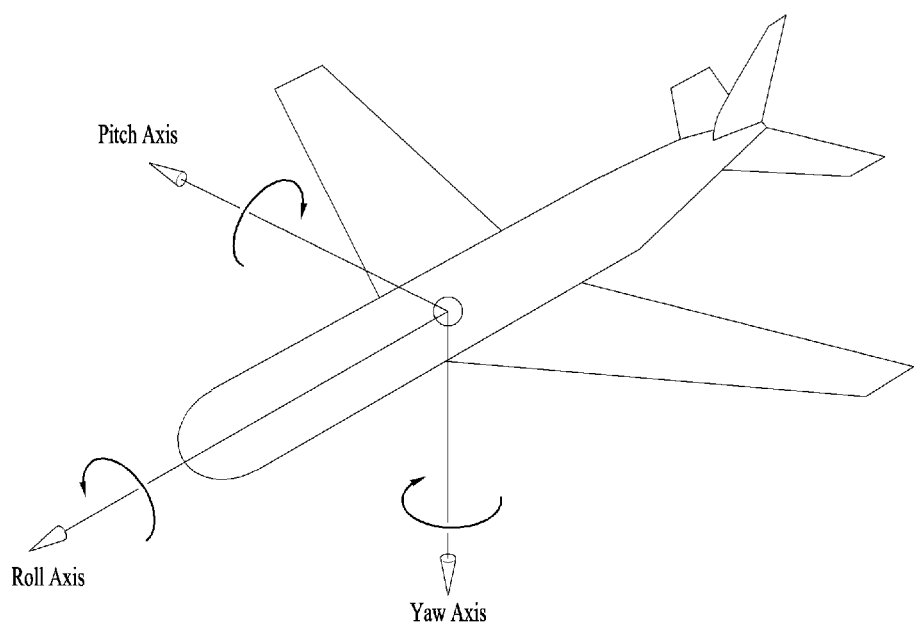
FIG. 5 illustrates the concept of aircraft principal axes for describing a 3D space of the present disclosure.

FIG. 5 illustrates the concept of aircraft principal axes for describing a 3D space of the present disclosure.

In the present disclosure, the concept of aircraft principal axes may be used to represent a specific point, location, direction, spacing and region in a 3D space.

That is, in the present disclosure, the concept of aircraft principal axes may be used to describe a 3D space before projection or after re-projection and to signal the same. According to an embodiment, a method using X, Y and Z axes or a spherical coordinate system may be used.

An aircraft may freely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis may refer to an axis connected between wings of the aircraft.

The yaw axis may refer to a reference axis of a direction in which the front end of the aircraft rotates to the left/right. In the shown concept of aircraft principal axes, the yaw axis may refer to an axis connected from the top to the bottom of the aircraft.

The roll axis may refer to an axis connected from the front end to the tail of the aircraft in the shown concept of aircraft principal axes, and rotation in the roll direction may refer to rotation based on the roll axis.

As described above, a 3D space in the present disclosure may be described using the concept of pitch, yaw and roll.

Figure 6:
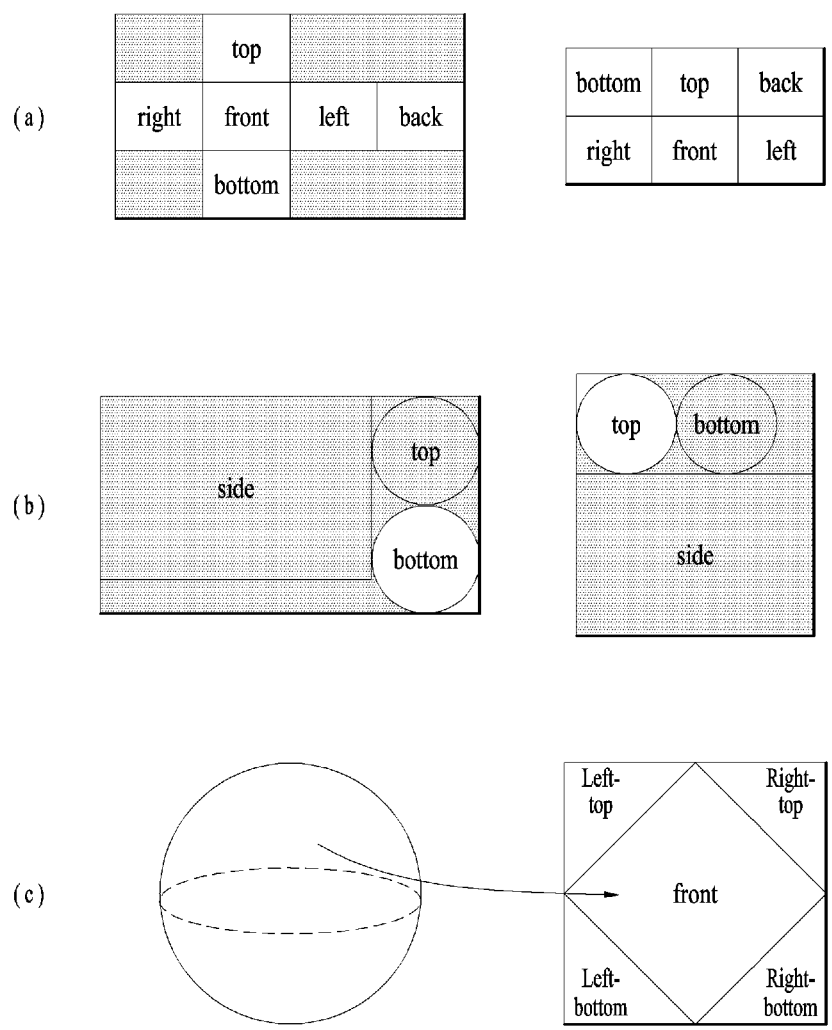
FIG. 6 illustrates projection schemes according to an embodiment of the present disclosure.

FIG. 6 illustrates projection schemes according to an embodiment of the present disclosure.

As described above, the projection processor of the 360 video transmission device according to the present disclosure may project stitched 360 video data on a 2D image. In this process, various projection schemes may be used.

According to another embodiment of the 360 video transmission device according to the present disclosure, the projection processor may perform projection using a cubic projection scheme. For example, stitched video data may be represented on a spherical plane. The projection processor may segment the 360 video data into a cube and project the same on the 2D image. The 360 video data on the spherical plane may correspond to planes of the cube and be projected on the 2D image as shown in (a).

According to another embodiment of the 360 video transmission device according to the present disclosure, the projection processor may perform projection using a cylindrical projection scheme. Similarly, if stitched video data may be represented on a spherical plane, the projection processor may segment the 360 video data into a cylinder and project the same on the 2D image. The 360 video data on the spherical plane may correspond to the side, top and bottom of the cylinder and be projected on the 2D image as shown in (b).

According to another embodiment of the 360 video transmission device according to the present disclosure, the projection processor may perform projection using a pyramid projection scheme. Similarly, if stitched video data may be represented on a spherical plane, the projection processor may regard the 360 video data as a pyramid form and project the same on the 2D image. The 360 video data on the spherical plane may correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube may be respective regions in (a). The side, top and bottom of the cylinder may be respective regions in (b). The front, left top, left bottom, right top and right bottom sides of the pyramid may be respective regions in (c).

Figure 7:
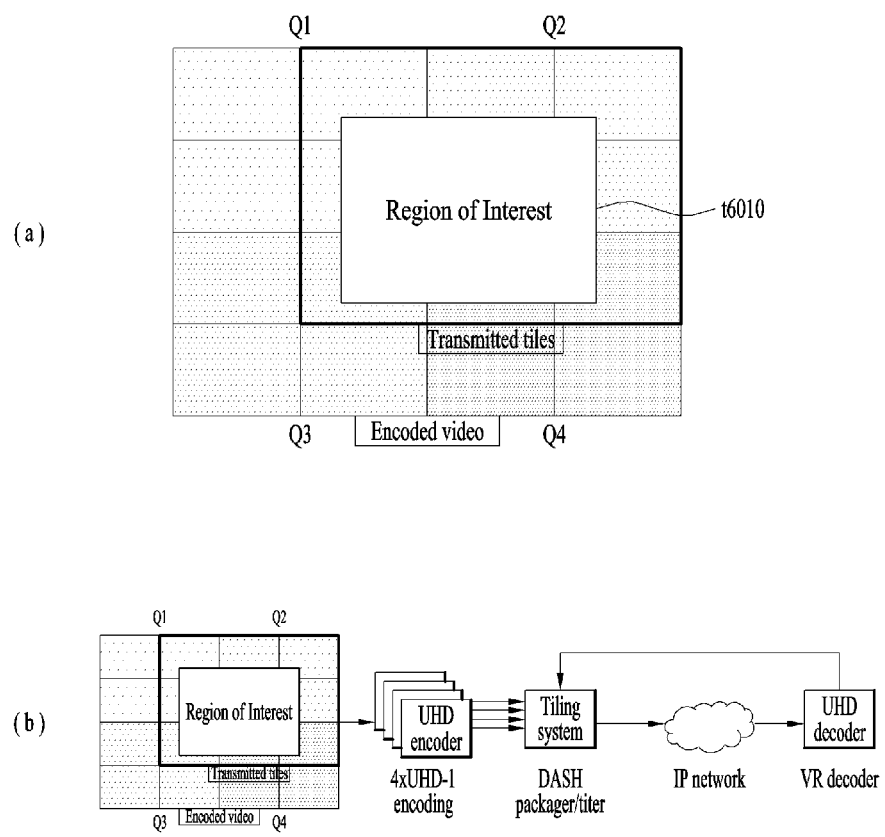
FIG. 7 illustrates tiles according to an embodiment of the present disclosure.

FIG. 7 illustrates tiles according to an embodiment of the present disclosure.

360 video data projected on a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission device according to the present disclosure, the data encoder may independently encode the tiles.

The aforementioned region-wise packing may be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a reception side on a limited bandwidth. Through tiling, a limited bandwidth may be used more efficiently and the reception side may reduce computational load compared to a case in which the entire 360 video data is processed simultaneously.

A region and a tile are discriminated from each other and thus they need not be identical. However, a region and a tile may refer to the same area according to an embodiment. Region-wise packing may be performed to tiles and thus regions may correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

Region of Interest (ROI) may refer to a region of interest of users, which is provided by a 360 content provider. When 360 video is produced, the 360 content provider may produce the 360 video in consideration of a specific region which is expected to be a region of interest of users. According to an embodiment, ROI may correspond to a region in which important content of the 360 video is reproduced.

According to another embodiment of the 360 video transmission/reception devices according to the present disclosure, the receiver feedback processor may extract and collect viewport information and deliver the same to the transmitter feedback processor. In this process, the viewport information may be delivered using network interfaces of both sides. In the 2D image shown in (a), a viewport t6010 is displayed. Here, the viewport may be displayed over nine tiles of the 2D images.

In this case, the 360 video transmission device may further include a tiling system. According to an embodiment, the tiling system may be located following the data encoder (b), may be included in the aforementioned data encoder or transmission processor, or may be included in the 360 video transmission device as a separate internal/external element.

The tiling system may receive viewport information from the transmitter feedback processor. The tiling system may select only tiles included in a viewport region and transmit the same. In the 2D image shown in (a), only nine tiles including the viewport region t6010 among 16 tiles may be transmitted. Here, the tiling system may transmit tiles in a unicast manner over a broadband because the viewport region is different for users.

In this case, the transmitter feedback processor may deliver the viewport information to the data encoder. The data encoder may encode the tiles including the viewport region with higher quality than other tiles.

Furthermore, the transmitter feedback processor may deliver the viewport information to the metadata processor.

The metadata processor may deliver metadata related to the viewport region to each internal element of the 360 video transmission device or include the metadata in 360 video related metadata.

By using this tiling method, transmission bandwidths may be saved and processes differentiated for tiles may be performed to achieve efficient data processing/transmission.

The above-described embodiments related to the viewport region may be applied to specific regions other than the viewport region in a similar manner. For example, the aforementioned processes performed on the viewport region may be performed on a region determined to be a region in which users are interested through the aforementioned gaze analysis, ROI, and a region (initial view, initial viewpoint) initially reproduced when a user views 360 video through a VR display.

According to another embodiment of the 360 video transmission device according to the present disclosure, the transmission processor may perform processing for transmission differently on tiles. The transmission processor may apply different transmission parameters (modulation orders, code rates, etc.) to tiles such that data delivered for the tiles has different robustnesses.

Here, the transmitter feedback processor may deliver feedback information received from the 360 video reception device to the transmission processor such that the transmission processor may perform transmission processing differentiated for tiles. For example, the transmitter feedback processor may deliver the viewport information received from the reception side to the transmission processor. The transmission processor may perform transmission processing such that tiles including the corresponding viewport region have higher robustness than other tiles.

FIG. 8 illustrates 360-degree video related metadata according to an embodiment of the present disclosure.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present disclosure may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present disclosure may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection scheme field, etc. According to an embodiment, the basic metadata may further include additional information.

The vr_geometry field may indicate the type of a 3D model supported by the corresponding 360 video data. When the 360 video data is re-projected on a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space may conform to 3D models of a sphere, a cube, a cylinder and a pyramid. When the field has the remaining values, the field may be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection scheme field may indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field may be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is stereoscopic field and/or a stereo_mode field. According to an embodiment, the stereoscopic related metadata may further include additional information.

The is stereoscopic field may indicate whether the 360 video data supports 3D. When the field is 1, the 360 video data supports 3D. When the field is 0, the 360 video data does not support 3D. This field may be omitted.

The stereo_mode field may indicate 3D layout supported by the corresponding 360 video. Whether the 360 video supports 3D may be indicated only using this field. In this case, the is stereoscopic field may be omitted. When the field is 0, the 360 video may be a mono mode. That is, the projected 2D image may include only one mono view. In this case, the 360 video may not support 3D.

When this field is 1 and 2, the 360 video may conform to left-right layout and top-bottom layout. The left-right layout and top-bottom layout may be called a side-by-side format and a top-bottom format. In the case of the left-right layout, 2D images on which left image/right image are projected may be locationed at the left/right on an image frame. In the case of the top-bottom layout, 2D images on which left image/right image are projected may be locationed at the top/bottom on an image frame. When the field has the remaining values, the field may be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field may indicate an initial view when the 360 video is reproduced. That is, the center point of a viewport which is initially viewed when the 360 video is reproduced may be indicated by these three fields. The fields may indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception device may provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user may change for each scene of the 360 video. In this case, the initial view/initial viewpoint related metadata may indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields may indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width_field, a max_width_field, a min_height field, a max_height field, a min_x field, a max_x field, a min_y field and/or a max_y field.

The min_top_left_x field, max_top_left_x field, min_top_left_y field, max_top_left_y field may represent minimum/maximum values of the coordinates of the left top end of the ROI. These fields may sequentially indicate a minimum x coordinate, a maximum x coordinate, a minimum y coordinate and a maximum y coordinate of the left top end.

The min_width field, max_width field, min_height field and max_height field may indicate minimum/maximum values of the width and height of the ROI. These fields may sequentially indicate a minimum value and a maximum value of the width and a minimum value and a maximum value of the height.

The min_x field, max_x field, min_y field and max_y field may indicate minimum and maximum values of coordinates in the ROI. These fields may sequentially indicate a minimum x coordinate, a maximum x coordinate, a minimum y coordinate and a maximum y coordinate of coordinates in the ROI. These fields may be omitted.

When ROI related metadata includes fields which indicate ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field may indicate a region occupied by ROI on a 3D space using minimum/maximum values of yaw, pitch and roll. These fields may sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field may indicate minimum/maximum values of FOV of the corresponding 360 video data. FOV may refer to the range of view displayed at once when 360 video is reproduced. The min_field_of_view field and max_field_of_view field may indicate minimum and maximum values of FOV. These fields may be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field may indicate whether corresponding 360 video includes information about FOV intended when the 360 video is produced. When this field value is 1, a content_fov field may be present.

The content_fov field may indicate information about FOV intended when the 360 video is produced. According to an embodiment, a region displayed to a user at once in the 360 video may be determined according to vertical or horizontal FOV of the 360 video reception device. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area may be called a cropped region or a default display region. The active video area is viewed as 360 video on an actual VR display and the 360 video reception device or the VR display may process/display only the active video area. For example, when the aspect ratio of the image frame is 4:3, only an area of the image frame other than an upper part and a lower part of the image frame may include 360 video data. This area may be called the active video area.

The cropped region related metadata may include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception device or the VR display. That is, this field may indicate whether the entire image frame indicates an active video area. When only part of the image frame is an active video area, the following four fields may be added.

A cr_region_left_top_x field, a cr_region_left_top_y field, a cr_region_width field and a cr_region_height field may indicate an active video area in an image frame. These fields may indicate the x coordinate of the left top, the y coordinate of the left top, the width and the height of the active video area. The width and the height may be represented in units of pixel.

As described above, the 360-degree video-related signaling information or metadata may be included in an arbitrarily defined signaling table, may be included in the form of a box in a file format such as ISOBMFF or Common File Format, or may be included and transmitted in a DASH MPD. In addition, 360-degree media data may be included and transmitted in such a file format or a DASH segment.

Hereinafter, ISOBMFF and DASH MPD will be described one by one.

Figure 9:
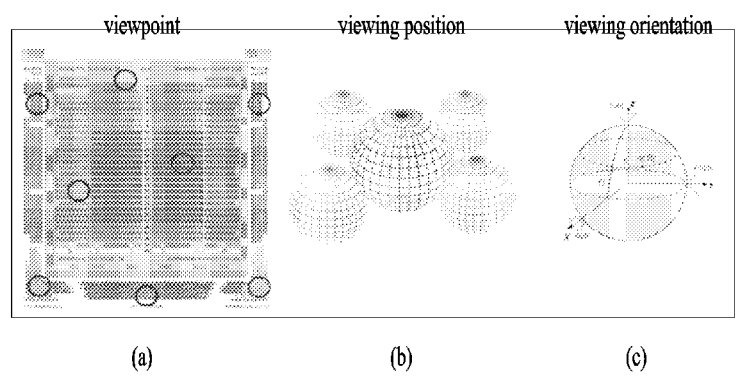
FIG. 9 illustrates a viewpoint and a viewing position that are additionally defined in the 3 DoF+ VR system.

FIG. 9 illustrates a viewpoint and viewing location additionally defined in a 3 DoF+ VR system.

The 360 video based VR system according to embodiments may provide visual/auditory experiences for different viewing orientations with respect to a location of a user for 360 video based on the 360 video processing process described above. This method may be referred to as three degree of freedom (3 DoF) plus. Specifically, the VR system that provides visual/auditory experiences for different orientations in a fixed location of a user may be referred to as a 3 DoF based VR system.

The VR system that may provide extended visual/auditory experiences for different orientations in different viewpoints and different viewing locations in the same time zone may be referred to as a 3 DoF+ or 3 DoF plus based VR system.

1) Assuming a space such as (a) (an example of art center), different locations (an example of art center marked with a red circle) may be considered as the respective viewpoints. Here, video/audio provided by the respective viewpoints existing in the same space as in the example may have the same time flow.

2) In this case, different visual/auditory experiences may be provided according to a viewpoint change (head motion) of a user in a specific location. That is, spheres of various viewing locations may be assumed as shown in (b) for a specific viewpoint, and video/audio/text information in which a relative location of each viewpoint is reflected may be provided.

3) Visual/auditory information of various orientations such as the existing 3 DoF may be delivered at a specific viewpoint of a specific location as shown in (c). In this case, additional various sources as well as main sources (video/audio/text) may be provided in combination, and this may be associated with a viewing orientation of a user or information may be delivered independently.

Figure 10:
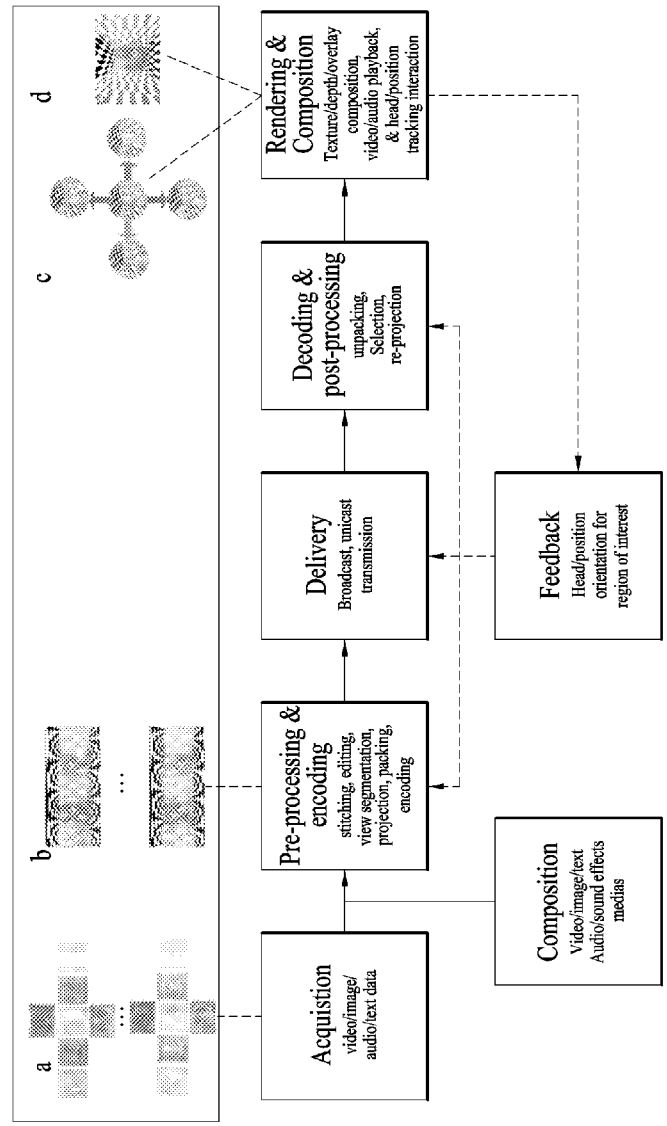
FIG. 10 illustrates a method of implementing 360-degree video signal processing and a related transmission/reception device based on a 3 DoF+ system.

FIG. 10 is a view showing a method for implementing 360-degree video signal processing and a related transmission device/reception device based on 3 DoF+ system.

FIG. 10 is an example of 3 DoF+ end-to-end system flow chart including video acquisition, preprocessing, transmission, (post)processing, rendering and feedback processes of 3 DoF+.

1) Acquisition: may mean a process of acquiring 360-degree video through capture, composition or generation of 360-degree video. Various kinds of video/audio information according to head motion may be acquired for a plurality of locations through this process. In this case, video information may include depth information as well as visual information (texture). At this time, a plurality of kinds of information of different viewing locations according to different viewpoints may be acquired as in the example of video information of a.

2) Composition: may define a method for composition to include video (video/image, etc.) through external media, voice (audio/effect sound, etc.) and text (caption, etc.) as well as information acquired through the video/audio input module in user experiences.

3) Preprocessing: is a preparation (preprocessing) process for transmission/delivery of the acquired 360-degree video, and may include stitching, projection, region wise packing and/or encoding process. That is, this process may include preprocessing and encoding processes for modifying/complementing data such as video/audio/text information according to a producer's intention. For example, the preprocessing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video according to a region, and encoding for compressing video information. A plurality of projection videos of different viewing locations according to different viewpoints may be generated like example in view of video of B.

4) Delivery: may mean a process of processing and transmitting video/audio data and metadata subjected to the preparation process (preprocessing). As a method for delivering a plurality of video/audio data and related metadata of different viewing locations according to different viewpoints, a broadcast network or a communication network may be used, or unidirectional delivery method may be used.

5) Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

6) Rendering: may mean a process of rendering and displaying re-projected image/video data on a 3D space. In this process, the process may be reconfigured to finally output video/audio signals. A viewing orientation, viewing location/head location and viewpoint, in which a user's region of interest exists, may be subjected to tracking, and necessary video/audio/text information may selectively be used according to this information. At this time, in case of video signal, different viewing locations may be selected according to the user's region of interest as shown in c, and video in a specific orientation of a specific viewpoint at a specific location may finally be output as shown in d.

7) Feedback: may mean a process of delivering various kinds of feedback information, which may be acquired during a display process, to a transmission side. In this embodiment, a viewing orientation, a viewing location, and a viewpoint, which corresponds to a user's region of interest, may be estimated, and feedback may be delivered to reproduce video/audio based on the estimated result.

Figure 11:
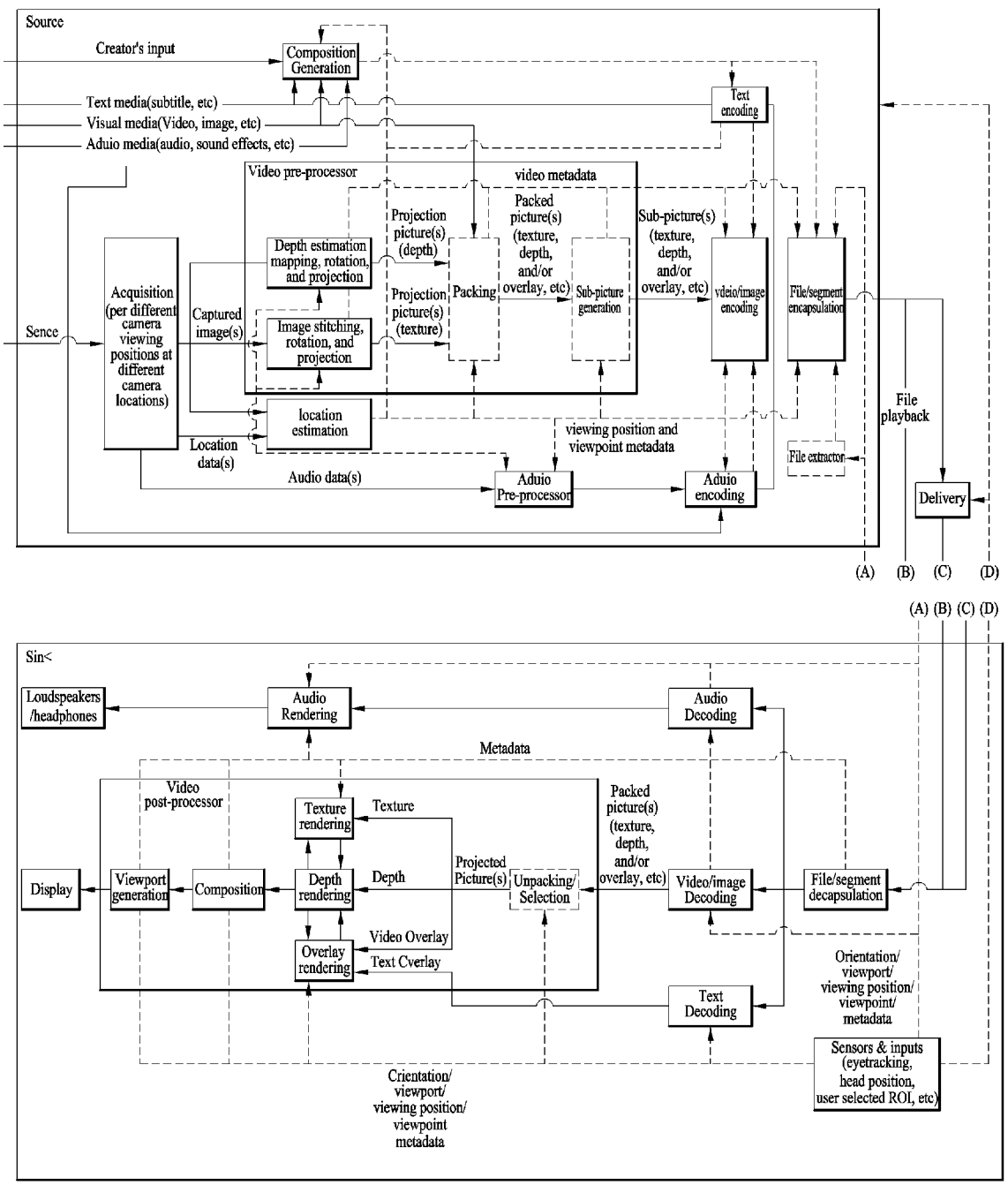
FIG. 11 shows the structure of a 3 DoF+ end-to-end system.

FIG. 11 illustrates an architecture of a 3 DoF+ end-to-end system.

FIG. 11 illustrates an architecture of a 3 DoF+ end-to-end system. As described in the architecture of FIG. 11, 3 DoF+ 360 contents may be provided.

The 360-degree video transmission device may include an acquisition unit for acquiring 360-degree video (image)/audio data, a video/audio pre-processor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception device through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information according to sensor orientation (viewing orientation in view of video), information acquisition timing of a sensor (sensor location, or viewing location in view of video), and information acquisition location of a sensor (viewpoint in case of video). At this time, video, image, audio and location information may be acquired.

In case of video data, texture and depth information may respectively be acquired, and video preprocessing may be performed according to characteristic of each component. For example, in case of the text information, 360-degree omnidirectional video may be configured using videos of different orientations of the same viewing location, which are acquired at the same viewpoint using image sensor location information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video preprocessing end is delivered as video metadata.

If additionally given video/audio/text information is served together with the acquired data (or data for main service), it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis according to application. At this time, only necessary information may be extracted (file extractor) according to a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing location information according to each viewpoint (viewing location and viewpoint metadata), etc. This information may be processed through a separate metadata processor.

The 360-degree video reception device may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text according to types of data and separately decoded to be reproduced.

The tracking unit generates viewpoint of a user's region of interest, viewing location at the corresponding viewpoint, and viewing orientation information at the corresponding viewing location based on a sensor and the user's input information. This information may be used for selection or extraction of a region of interest in each module of the 360-degree video reception device, or may be used for a post-processing process for emphasizing information of the region of interest. Also, if this information is delivered to the 360-degree video transmission device, this information may be used for file selection (file extractor) or subpicture selection for efficient bandwidth use, and may be used for various video reconfiguration methods based on a region of interest (viewport/viewing location/viewpoint dependent processing).

The decoded video signal may be processed according to various processing methods of the video configuration method. If image packing is performed in the 360-degree video transmission device, a process of reconfiguring video is required based on the information delivered through metadata. In this case, video metadata generated by the 360-degree video transmission device may be used. Also, if videos of a plurality of viewpoints or a plurality of viewing locations or various orientations are included in the decoded video, information matched with viewpoint, viewing location, and orientation information of the user's region of interest, which are generated through tracking, may be selected and processed. At this time, viewing location and viewpoint metadata generated at the transmission side may be used. Also, if a plurality of components are delivered for a specific location, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated according to the user's ROI.

The decoded audio signal may be generated as an audio signal capable of being reproduced, through an audio renderer and/or the post-processing process. At this time, information suitable for the user's request may be generated based on the information on the user's ROI and the metadata delivered to the 360-degree video reception device.

The decoded text signal may be delivered to an overlay renderer and processed as overlay information based on text such as subtitle. A separate text post-processing process may be included, if necessary.

Figure 12:
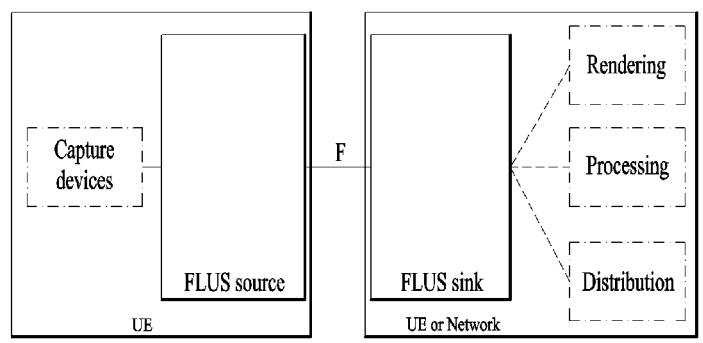
FIG. 12 shows the structure of Framework for Live Uplink Streaming (FLUS).

FIG. 12 illustrates an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission device or the aforementioned 360-degree reception device.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

Figure 13:
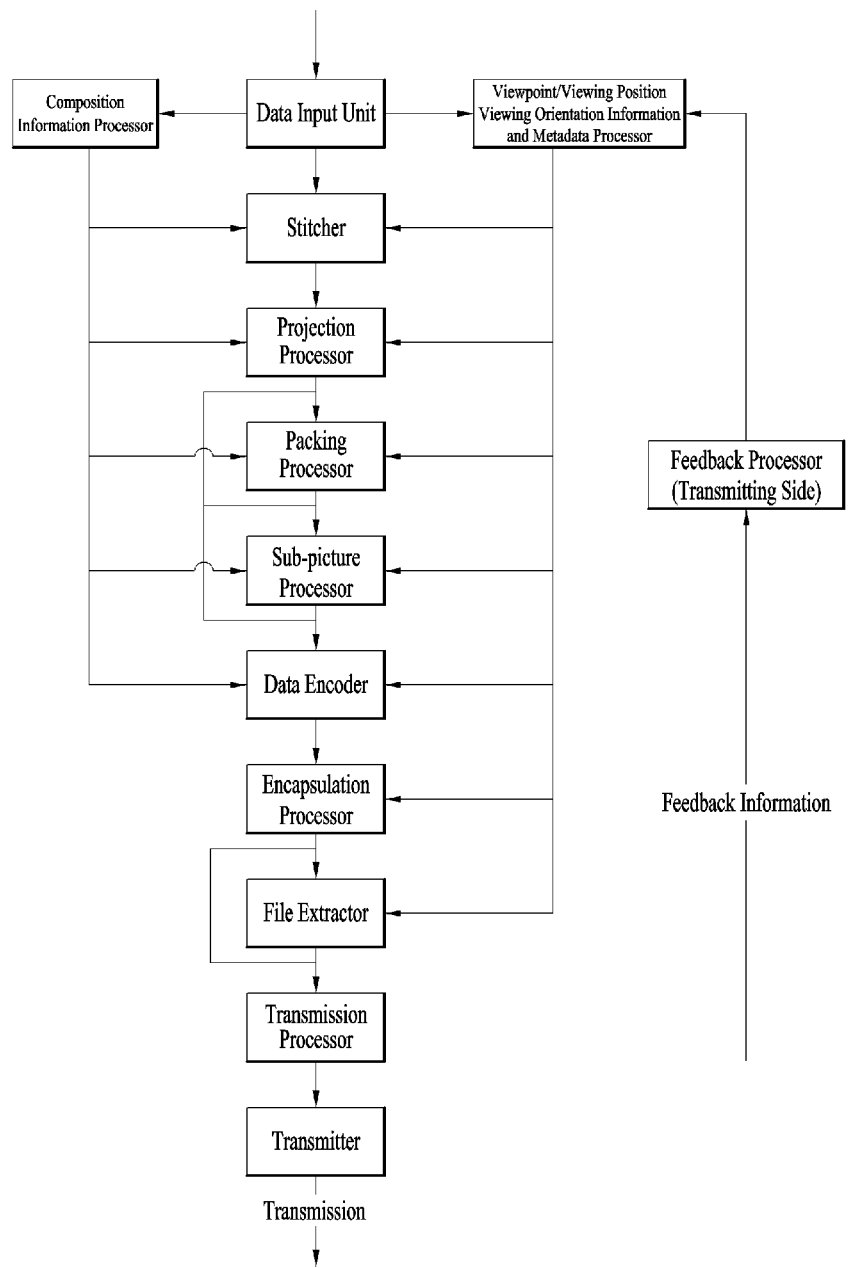
FIG. 13 illustrates the configuration of a 3 DoF+ transmission terminal.

FIG. 13 is a view showing a configuration of 3 DoF+ transmission side.

The transmission side (the 360 video transmission device) may perform stitching for a spherical image configuration per viewpoint/viewing position/component if input data are images output through a camera. If sphere images per viewpoint/viewing position/component are configured, the transmission side may perform projection for coding in 2D image. The transmission side may generate a plurality of images as subpictures of a packing or segmented region for making an integrated image according to application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed according to application or request of the system. The generated bitstreams may be transformed into the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

Figure 14:
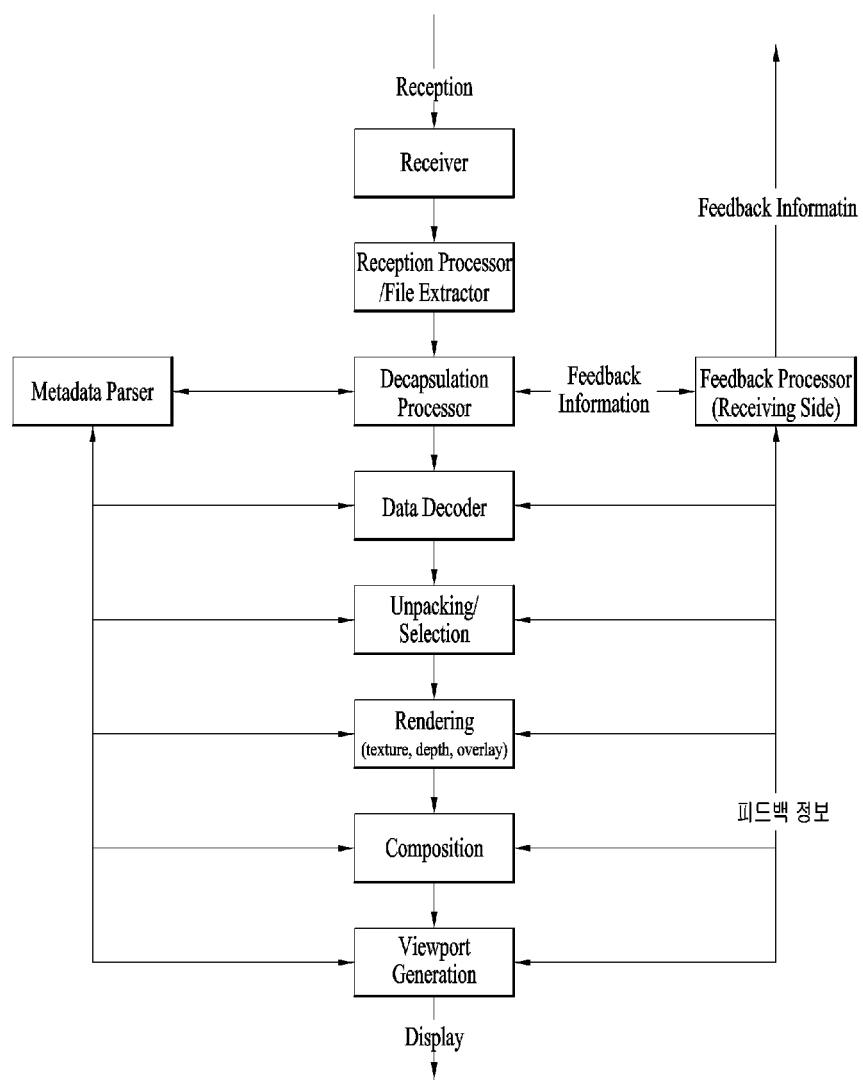
FIG. 14 illustrates the configuration of a 3 DoF+ reception terminal.

FIG. 14 illustrates a configuration of 3 DoF+ reception terminal.

The reception terminal (the 360 video reception device) may extract a necessary file after receiving the bitstreams delivered from the transmission side. The reception terminal may select bitstreams in the generated file format by using the viewpoint/viewing position/orientation information delivered from the feedback processor and reconfigure the selected bitstreams as image information through the decoder. The reception terminal may perform unpacking for the packed image based on packing information delivered through the metadata. If the packing process is omitted in the transmission side, unpacking of the reception terminal may also be omitted. Also, the reception terminal may perform a process of selecting images suitable for the viewpoint/viewing position/orientation information delivered from the feedback processor and necessary components if necessary. The reception terminal may perform a rendering process of reconfiguring texture, depth and overlay information of images as a format suitable for reproduction. The reception terminal may perform a composition process for composing information of different layers before generating a final image, and may generate and reproduce an image suitable for a display viewport.

Figure 15:
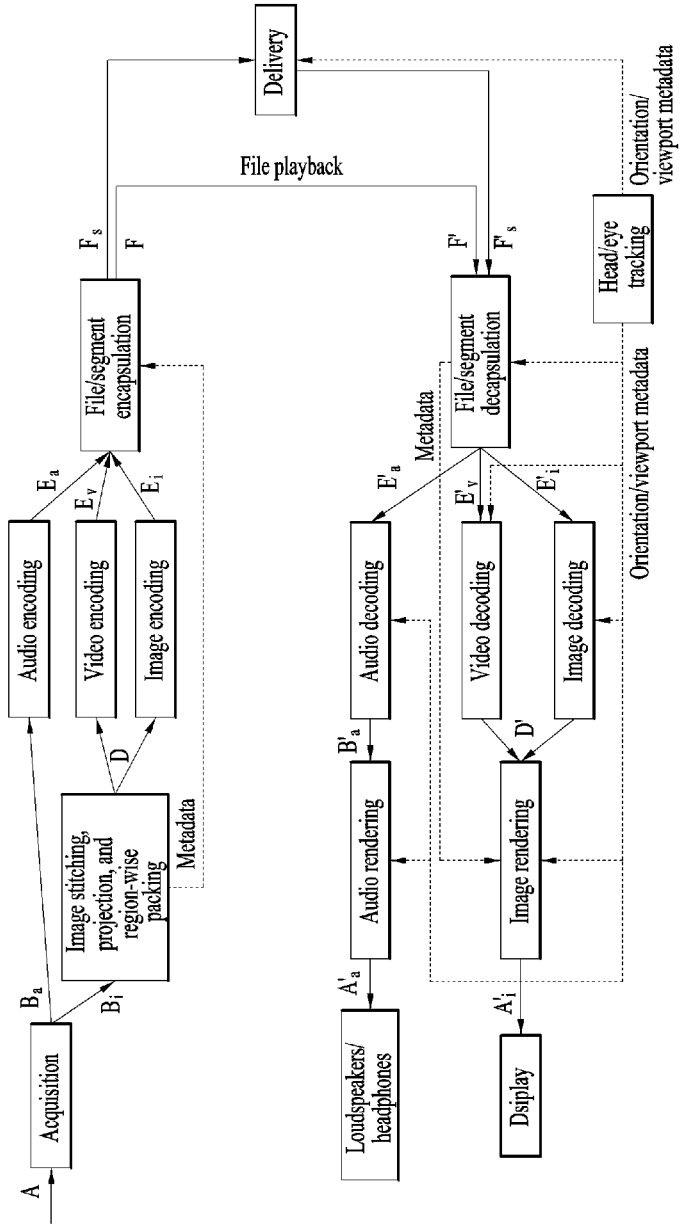
FIG. 15 shows an OMAF structure.

FIG. 15 shows an OMAF structure.

The 360 video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3 DoF based service. Meanwhile, a service for providing extended visual/auditory experiences for different orientations in a random viewpoint and viewing position at the same time zone may be referred to as a 6 DoF (six degree of freedom) based service.

A file format for 3 DoF service has a structure in which a position of rendering, information of a file to be transmitted, and decoding information may be varied depending on a head/eye tracking module as shown in FIG. 15. However, this structure is not suitable for transmission of a media file of 6 DoF in which rendering information/transmission details and decoding information are varied depending on a viewpoint or position of a user, correction is required.

Figure 16:
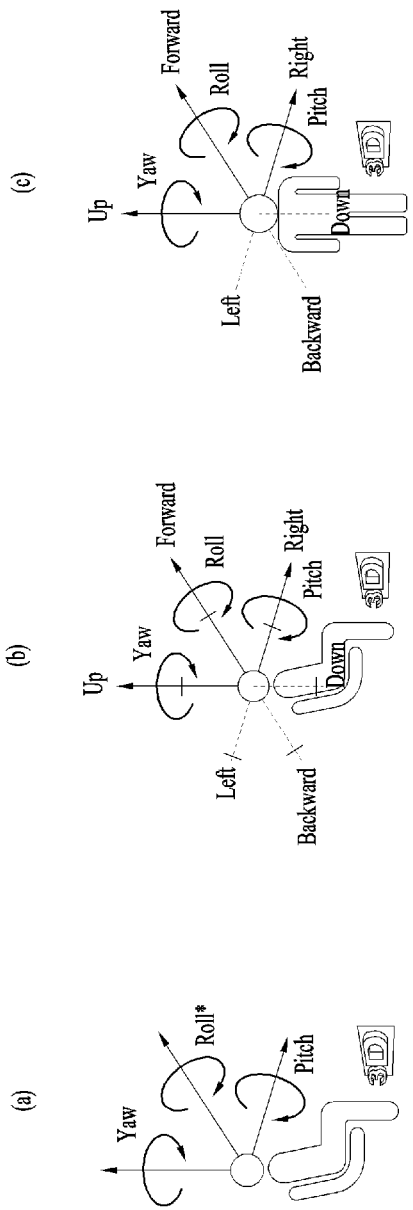
FIG. 16 shows a type of media according to movement of a user.

FIG. 16 shows a type of media according to movement of a user.

The present disclosure provides a method for providing 6 DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which may provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6 DoF video and 6 DoF audio for providing corresponding contents, wherein 6 DoF video may mean video or image required to provide realistic media contents and captured or reproduced as 3 DoF or 360-degree video newly formed during every movement. 6 DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6 DoF audio is an audio content for providing a content to allow a user to experience realistic media, and may mean contents for newly forming and consuming a spatial audio according to movement of a position where sound is consumed.

The present disclosure provides a method for effectively providing 6 DoF video. The 6 DoF video may be captured at different positions by two or more cameras. The captured video may be transmitted through a series of processes, and the reception terminal may process and render some of the received data as 360-degree video having an initial position of the user as a starting point. If the position of the user moves, the reception terminal may process and render new 360-degree video based on the position where the user has moved, whereby the 6 DoF video may be provided to the user.

Hereinafter, a transmission method and a reception method for providing 6 DoF video services will be described.

Figure 17:
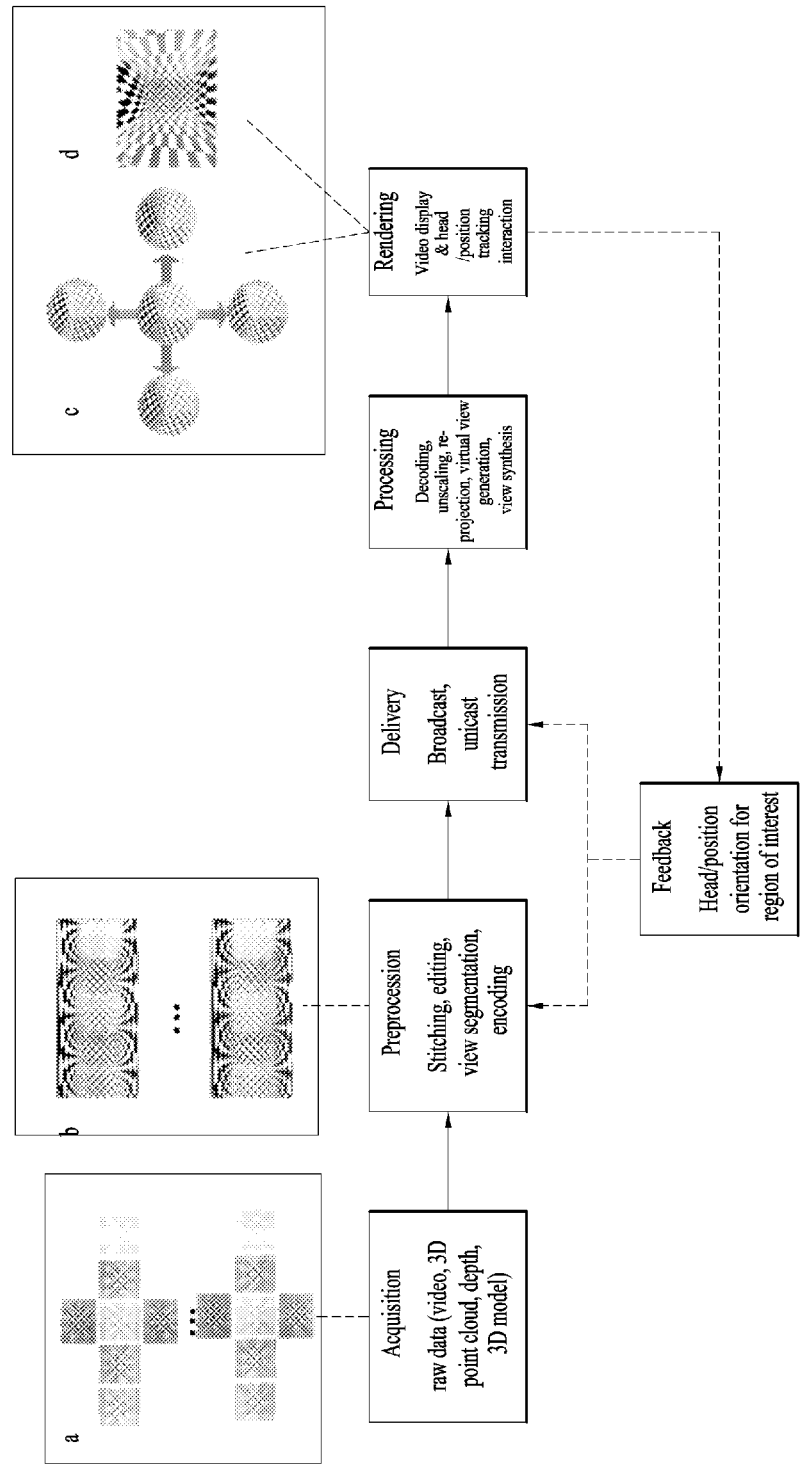
FIG. 17 shows an overall architecture for providing 6 DoF video.

FIG. 17 shows an overall architecture for providing 6 DoF video.

A series of processes described above will be described in detail based on FIG. 17. First of all, as an acquisition step, HDCA (High Density Camera Array), Lenslet (microlens) camera, etc. may be used to capture 6 DoF contents, and 6 DoF video may be acquired by a new device designed for capture of the 6 DoF video. The acquired video may be generated as several image/video data sets generated according to a position of a camera, which is captured as shown in FIG. 3a. At this time, metadata such as internal/external setup values of the camera may be generated during the capturing process. In case of image generated by a computer not the camera, the capturing process may be replaced. The preprocessing process of the acquired video may be a process of processing the captured image/video and the metadata delivered through the capturing process. This process may correspond to all of types of preprocessing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in FIG. 3b, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may be newly generated as virtual information by the receiver in some cases.

In some embodiments, the preprocessing process may further include an editing process. In this process, editing for image/video data may further be performed before and after projection, and metadata may be generated even during the preprocessing process. Also, when the image/video are provided, metadata for an initial view to be first reproduced and an initial position and a region of interest (ROI) of a user may be generated.

The media transmission step may be a process of processing and transmitting the image/video data and metadata acquired during the preprocessing process. Processing according to a random transmission protocol may be performed for transmission, and the pre-processed data may be delivered through a broadcast network and/or a broadband. The pre-processed data may be delivered to the reception terminal on demand.

The processing process may include all steps before image is generated, wherein all steps may include decoding the received image/video data and metadata, re-projection which may be called mapping or projection into a 3D model, and a virtual view generation and synthesis process. The 3D model which is mapped or a projection map may include a sphere, a cube, a cylinder or a pyramid like the existing 360-degree video, and may be a modified type of a projection map of the existing 360-degree video, or may be a projection map of a free type in some cases.

The virtual view generation and synthesis process may mean a process of generating and composing the image/video data to be reproduced when the user moves between the primary view and the secondary view or between the primary view and the primary view. The process of processing the metadata delivered during the capture and preprocessing processes may be required to generate the virtual view. In some cases, only some of the 360 images/videos may be generated/synthesized.

In some embodiments, the processing process may further include an editing process, an up scaling process, and a down scaling process. Additional editing required before reproduction may be applied to the editing process after the processing process. The process of up scaling or down scaling the received images/videos may be performed, if necessary.

The rendering process may mean a process of rendering image/video, which is re-projected by being transmitted or generated, to be displayed. As the case may be, rendering and re-projection process may be referred to as rendering. Therefore, the rendering process may include the re-projection process. A plurality of re-projection results may exist in the form of 360 degree video/image based on the user and 360 degree video/image formed based on the position where the user moves according to a moving direction as shown in FIG. 3c. The user may view some region of the 360 degree video/image according to a device to be displayed. At this time, the region viewed by the user may be a form as shown in FIG. 3d. When the user moves, the entire 360 degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which may be acquired during the display process, to the transmission side. Interactivity between 6 DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
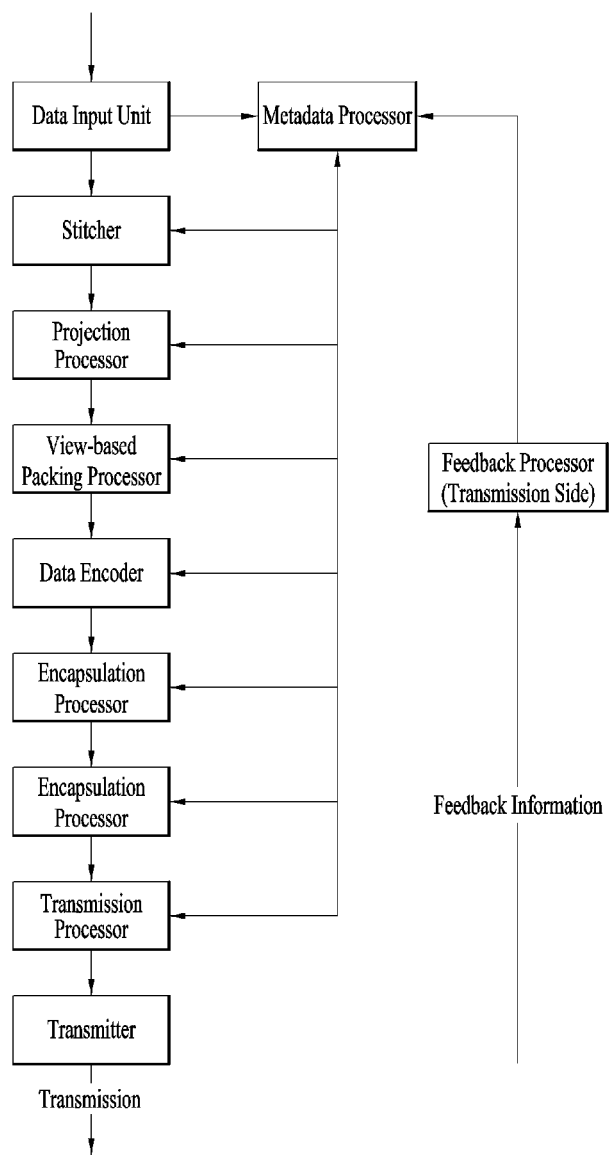
FIG. 18 illustrates the configuration of a transmission device for providing a 6 DoF video service.

FIG. 18 illustrates the configuration of a transmission device for providing a 6 DoF video service.

The present disclosure may relate to a 6 DoF video transmission device at the transmission side. The 6 DoF video transmission device according to the present disclosure may perform the aforementioned preparation processes and operations. The 6 DoF video/image transmission device according to the present disclosure may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmitter as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360 degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6 DoF video data to 2D image frame. The projection processor may obtain different types of results according to a scheme, and the corresponding scheme may similar to the projection scheme of the existing 360 degree video, or a scheme newly proposed for 6 DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6 DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6 DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception terminal.

The data encoder may encode the 6 DoF video data projected on the 2D image frame and/or the view/region-wise packed video data. The video data may be encoded in various formats, and encoded result values per view may be delivered separately if category per view is made.

The encapsulation processor may encapsulate the encoded 6 DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission processor may perform additional processing for transmission on the encapsulated video data according to the format. The corresponding processing may be performed using the metadata received from the metadata processor. The transmitter may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception device, which will be described later in the present disclosure, and may deliver the feedback information to the feedback processor (transmission side). The feedback processor may deliver the information received from the reception terminal to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6 DoF video transmission device may be hardware components implemented by hardware. In some embodiments, the respective components may be modified or omitted or new components may be added thereto, or may be replaced with or incorporated into the other components.

Figure 19:
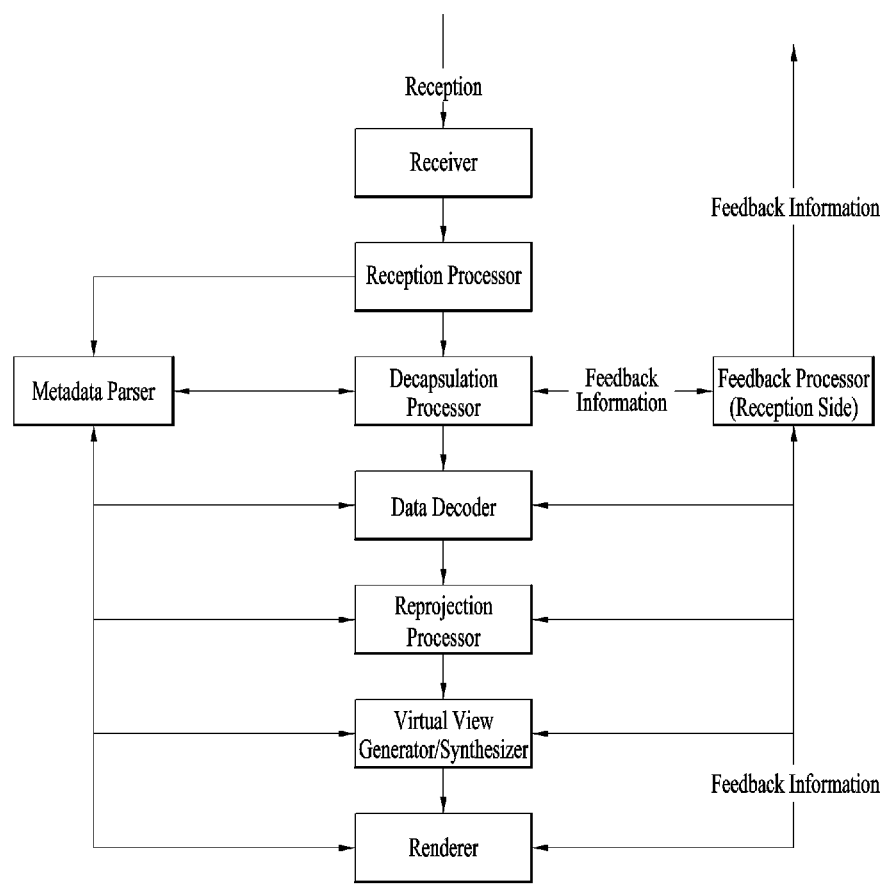
FIG. 19 illustrates the configuration of a 6 DoF video reception device.

FIG. 19 illustrates the configuration of a 6 DoF video reception device.

The present disclosure may be related to the reception device. According to the present disclosure, the 6 DoF video reception device may include a reception unit, a reception processor, a decapsulation-processor, a metadata parser, a feedback processor, a data decoder, a re-projection processor, a virtual view generation/synthesis unit and/or a renderer as components.

The reception unit may receive video data from the aforementioned 6 DoF transmission device. The reception unit may receive the video data through a broadcast network or a broadband according to a channel through which the video data are transmitted.

The reception processor may perform processing according to a transmission protocol for the received 6 DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6 DoF video data received in the form of file from the reception-processor. The decapsulation-processor may decapsulate the files to be matched with the corresponding file format to acquire 6 DoF video and/or metadata. The acquired 6 DoF video data may be delivered to the data decoder, and the acquired 6 DoF metadata may be delivered to the metadata parser. The decapsulation-processor may receive metadata necessary for decapsulation from the metadata parser, when necessary.

The data decoder may decode the 6 DoF video data. The data decoder may receive metadata necessary for decoding from the metadata parser. The metadata acquired during the data decoding process may be delivered to the metadata parser and then processed.

The metadata parser may parse/decode the 6 DoF video-related metadata. The metadata parser may deliver the acquired metadata to the decapsulation-processor, the data decoder, the re-projection processor, the virtual view generation/synthesis unit and/or the renderer.

The re-projection processor may re-project the decoded 6 DoF video data. The re-projection processor may re-project the 6 DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6 DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/synthesis unit may generate video data, which are not included in the 6 DoF video data re-projected by being transmitted and received on the 3D space but need to be reproduced, in a virtual view area by using given data, and may compose video data in a new view/position based on the virtual view. The virtual view generation/synthesis unit may use data of the depth information processor (not shown) when generating video data of a new view. The virtual view generation/synthesis unit may generate/compose the specific area received from the metadata parser and a portion of a peripheral virtual view area, which is not received. The virtual view generation/synthesis unit may selectively be performed, and is performed when there is no video information corresponding to a necessary view and position.

The renderer may render the 6 DoF video data delivered from the re-projection unit and the virtual view generation/synthesis unit. As described above, all the processes occurring in the re-projection unit or the virtual view generation/synthesis unit on the 3D space may be incorporated within the renderer such that the renderer may perform these processes. In some embodiments, the renderer may render only a portion that is being viewed by a user and a portion on a predicted path according to the user's view/position information.

In the present disclosure, the feedback processor (reception terminal) and/or the network interface (not shown) may be included as additional components. The feedback processor of the reception terminal may acquire and process feedback information from the renderer, the virtual view generation/synthesis unit, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmitter. The feedback information may be consumed in each component of the reception terminal. For example, the decapsulation processor may receive position/viewpoint information of the user from the feedback processor, and may perform decapsulation, decoding, re-projection and rendering for corresponding position information if there is the corresponding position information in the received 6 DoF video. If there is no corresponding position information, the 6 DoF video located near the corresponding position may be subjected to decapsulation, decoding, re-projection, virtual view generation/synthesis, and rendering.

The components of the aforementioned 6 DoF video reception device may be hardware components implemented by hardware. In some embodiments, the respective components may be modified or omitted or new components may be added thereto, or may be replaced with or incorporated into the other components.

Figure 20:
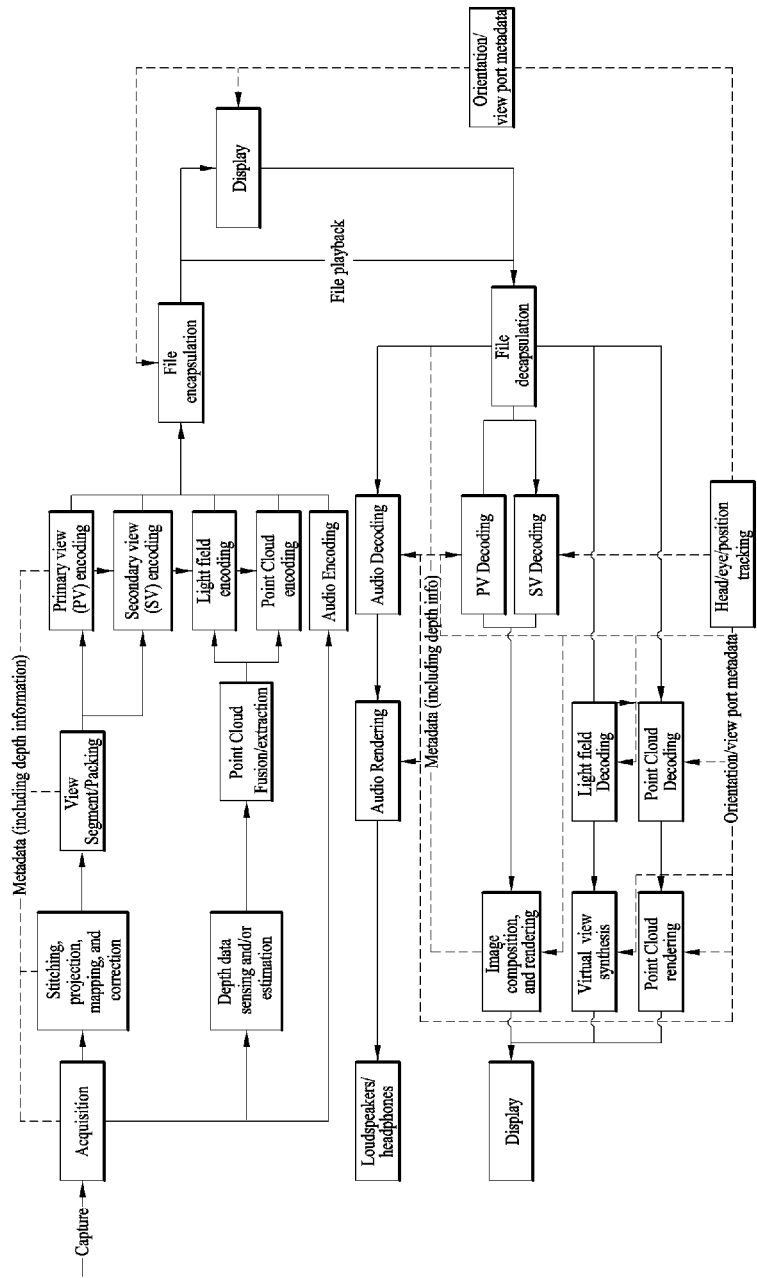
FIG. 20 illustrates the configuration of a 6 DoF video transmission/reception device.

FIG. 20 illustrates a configuration of a 6 DoF video transmission/reception device.

6 DoF contents may be provided in the form of a file or a segment-based download or streaming service such as DASH, or a new file format or streaming/download service method may be used. In this case, 6 DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio encoding: 6 DoF audio data may be subjected to audio preprocessing and encoding. In this process, metadata may be generated, and related metadata may be subjected to encapsulation/encoding for transmission.

Stitching, projection, mapping, and correction: 6 DoF video data may be subjected to editing, stitching and projection of the image acquired at various positions as described above. Some of these processes may be performed according to the embodiment, or all of the processes may be omitted and then may be performed by the reception terminal.

View segmentation/packing: As described above, the view segmentation/packing processor may segment images of a primary view (PV), which are required by the reception terminal, based on the stitched image and pack the segmented images and then perform preprocessing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point cloud fusion/extraction: a process of modifying a previously acquired depth map to data capable of being encoded may be performed. For example, a preprocessing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6 DoF video data may be processed in a file format such as ISOBMFF by file-encapsulation which is the encapsulation processor. Alternatively, the encoded 6 DoF video data may be processed into segments.

Metadata (including depth information): Like the 6 DoF video data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception terminal. The reception terminal may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception device may perform processing for 6 DoF video/audio data reception.

Audio decoding/audio rendering/loudspeakers/headphones: The 6 DoF audio data may be provided to a user through a speaker or headphone after being subjected to audio decoding and rendering.

PV/SV/light field/point cloud decoding: The 6 DoF video data may be image or video decoded. As a codec applied to decoding, a codec newly proposed for 6 DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point cloud rendering: when captured video/image data are re-projected on a 3D space, a 3D spatial position is configured, and a process of generating a 3D space of a virtual view to which a user may move is performed although the virtual view is failed to be obtained from the received video/image data.

Virtual view synthesis: a process of generating and synthesizing video data of a new view is performed using 6 DoF video data already acquired near a user's position/view if there is no 6 DoF video data in a space in which the user is located, as described above. In some embodiments, the virtual view generation and/or synthesis process may be omitted.

Image composition and rendering: as a process of rendering image based on a user's position, video data decoded according to the user's position and eyes may be used or video and image near the user, which are made by the virtual view generation/synthesis, may be rendered.

Figure 21:
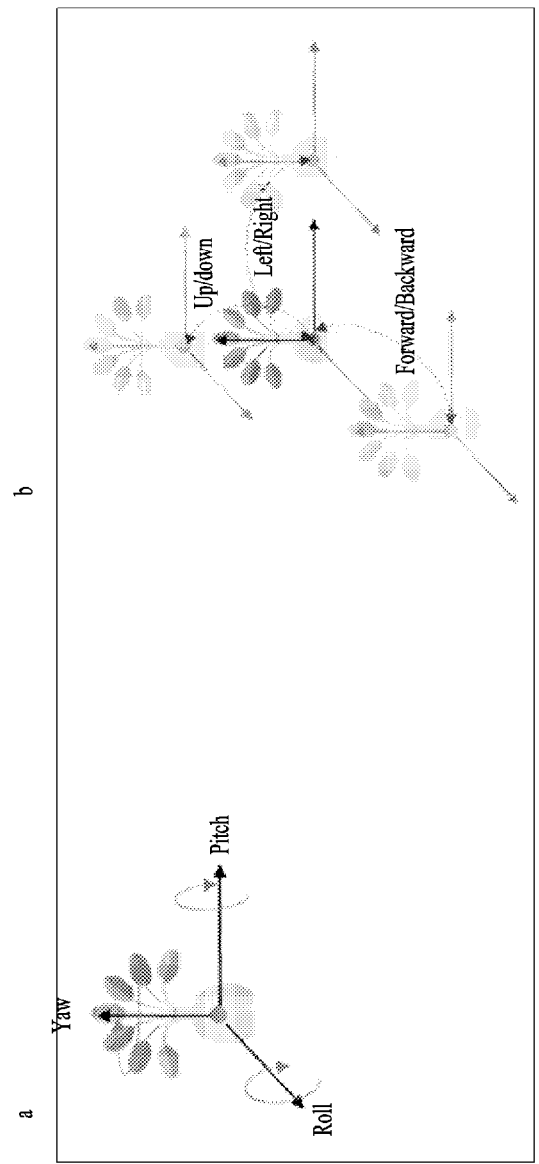
FIG. 21 shows a 6 DoF space.

FIG. 21 shows a 6 DoF space.

In the present disclosure, a 6 DoF space before projection or after re-projection will be described and the concept of FIG. 21 may be used to perform corresponding signaling.

The 6 DoF space may categorize an orientation of movement into two types, rational and translation, unlike the case that the 360 degree video or 3 DoF space is described by yaw, pitch and roll. Rational movement may be described by yaw, pitch and roll as described in the orientation of the existing 3 DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present disclosure proposes an architecture for 6 DoF video service and streaming, and also proposes basic metadata for file storage and signaling for future use in the invention for 6 DoF related metadata and signaling extension.

Metadata generated in each process may be extended based on the proposed 6 DoF transceiver architecture.

Metadata generated among the processes of the proposed architecture may be proposed.

6 DoF video related parameter of contents for providing 6 DoF video services by later addition/correction/extension based on the proposed metadata may be stored in a file such as ISOBMFF and signaled.

6 DoF video metadata may be stored and signaled through SEI or VUI of 6 DoF video stream by later addition/correction/extension based on the proposed metadata.

Region (meaning in region-wise packing): Region may mean a region where 360 video data projected on 2D image is located in a packed frame through region-wise packing. In this case, the region may refer to a region used in region-wise packing depending on the context. As described above, regions may be identified by equally dividing 2D image, or may be identified by being randomly divided according to a projection scheme.

Region (general meaning): Unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: may mean the entire 2D image in which 360 degree video data are projected. In some embodiments, a projected frame or a packed frame may be the picture.

Sub-picture: A sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: A tile is a sub-concept of a sub-picture, and the sub-picture may be used as a tile for tiling. That is, the sub-picture and the tile in tiling may be the same concept.

Specifically, the tile may be a tool enabling parallel decoding or a tool for independent decoding in VR. In VR, a tile may mean a Motion Constrained Tile Set (MCTS) that restricts a range of temporal inter prediction to a current tile internal range. Therefore, the tile herein may be called MCTS.

Spherical region: spherical region or sphere region may mean one region on a spherical surface when 360 degree video data are rendered on a 3D space (for example, spherical surface) at the reception terminal. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. According to the context, the spherical region may simply be called region.

Face: Face may be a term referring to each face according to a projection scheme. For example, if cube map projection is used, a front face, a rear face, side face, an upper face, or a lower face may be called face.

Figure 22:
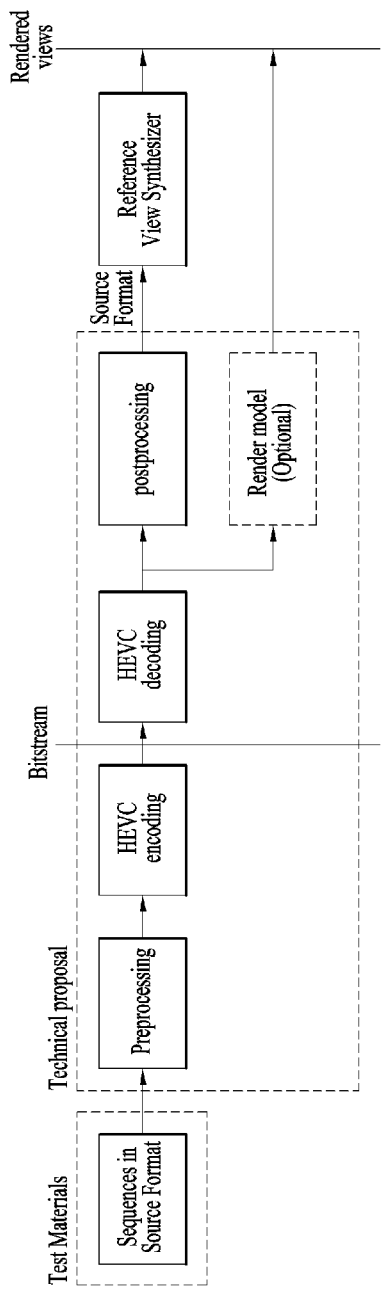
FIG. 22 illustrates the structure of 3 DoF+ video processing.

FIG. 22 illustrates the structure of 3 DoF+ video processing.

3 DoF+ video processing includes the structure of a video transmission method and a video reception method according to embodiments of the present disclosure. The video transmission method may refer to an operation of the encoder, and the video reception method may refer to an operation of the decoder.

The 3 DoF+ video processing process at the encoder includes preprocessing and HEVC encoding. The operations are performed by the pre-processor and/or encoder of the video transmission device, respectively.

The 3 DoF+ video processing process at the decoder includes HEVC decoding, post-processing, and a render model. The operations are performed by the decoder, post-processor, and/or render model unit of the video reception device, respectively.

In the preprocessing, sequences are received in a source format. The preprocessing may receive test materials and perform preprocessing on the test materials.

The preprocessing may include view selection, view analysis, packing, and/or projection. The view analysis may include view estimation, inter-position redundancy removal.

Specifically, the packing scheme provides an optimal packing combination based on the texture, depth, patch, and residual of the data. A method of reducing redundancy in packing is also proposed. Proposed herein is a method of processing packing in the same viewing direction by processing dependent on the viewport/viewing position.

Here, the viewing direction represents the direction in which the user views face. The viewing position represents the position of the user's head in a 3 DoF+ environment. The viewport represents the position of the user's body.

Also, since the residual divides an image into patches, it may represent a set of significant or valid pixel information. Each picture may have a residual. In estimating an image corresponding to a viewing position from an image corresponding to a specific viewing position, an error that occurs when the original image cannot be accurately estimated is called a residual.

As a method of transmitting bitstream data from the encoder to the decoder, frame packing or multicast may be used.

In the encoding, data is encoded using the HEVC encoding scheme and transmitted in the form of a bitstream to the decoder or the video reception device.

In the decoding, the data is decoded using the HEVC decoding scheme.

The post-processing is dependent on the preprocessing. The post-processing regenerates views on the source position.

The render model may additionally perform modeling for rendering of the decoded data. The render model process may be optionally performed. The render model generates rendered views.

The reference view synthesizer may receive post-processed data and synthesize views to generate a rendered view. The reference view synthesizer may receive post-processed data in a source format.

Hereinafter, a specific method of 3 DoF+ video processing will be described.

Figure 23:
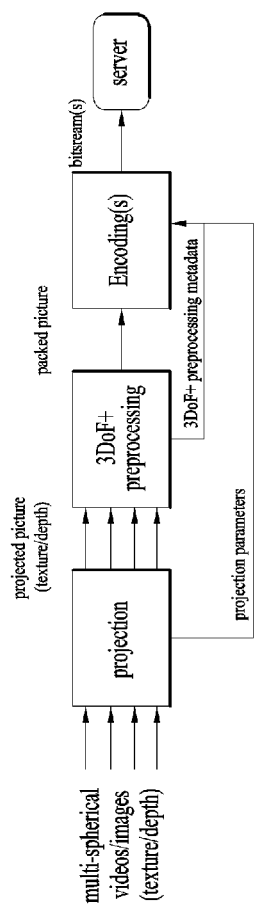
FIG. 23 illustrates the configuration of preprocessing.

FIG. 23 illustrates the configuration of preprocessing.

The preprocessing may include projection, 3 DoF+ preprocessing, and/or encoding. Each operation in the preprocessing may be performed by a pre-processor of the video transmission device.

In the projection, multi-spherical videos/images and texture/depth information thereabout, which is metadata, are received. In the projection, a spherical image per viewpoint/viewing position/component is projected into a 2D image based on the texture/depth. Here, projection parameters for the projection may be generated. The projection parameters may be used in the encoding process.

In the 3 DoF+ preprocessing, a projected picture, texture, depth, and the like are received. In the preprocessing, preprocessing for generation of 3 DoF+ video data is performed on a picture, and 3 DoF+ preprocessing metadata is generated and provided to the encoding process. In the preprocessing, processing such as packing is performed. A detailed process of the preprocessing will be described below.

In the encoding, a packed picture, 3 DoF+ preprocessing metadata, and projection parameters are received, and the packed picture is encoded based on the 3 DoF+ preprocessing metadata and the projection parameters. The encoded picture is transmitted through the server in the form of a bitstream.

Figure 24:
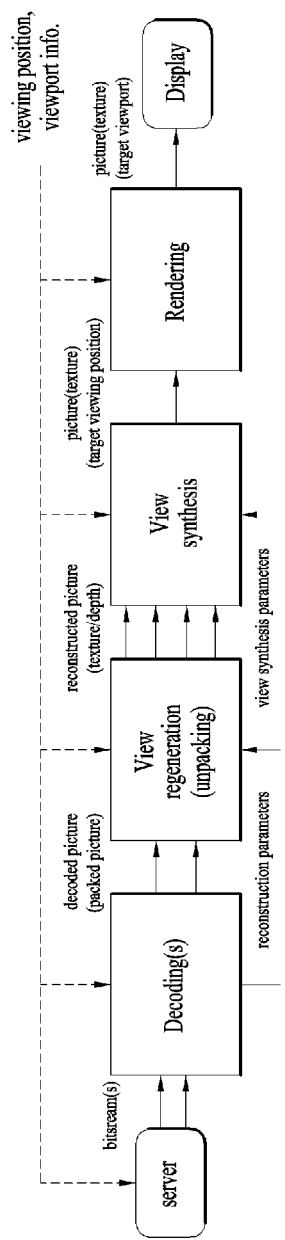
FIG. 24 illustrates the configuration of post-processing.

FIG. 24 illustrates the configuration of post-processing.

The post-processing may include decoding, view regeneration, view synthesis, and/or rendering. Each operation in the post-processing may be processed by the decoder, view/viewport regenerator, view synthesizer, pre-processor, and/or renderer of video receiver.

In the decoding, data is received in the form of a bitstream from a server, and is decoded.

In the view regeneration, a decoded picture (or a packed picture) is received and an operation such as unpacking is performed based on a reconstruction parameter generated in the decoding. The detailed operation of the view regeneration will be described later.

In the view synthesis, a reconstructed picture is synthesized based on the texture, depth, view synthesis parameters, viewing position information, and/or viewport information. The specific operation of the view syntheses will be described later.

In the rendering, a picture including a texture may be received and rendered. In the rendering, a picture may be rendered using target viewing position information.

The display may display the picture including the texture based on the target viewport information.

Each operation of the decoding, view regeneration, view synthesis, and/or rendering may use viewing position and viewport information. Viewing position and viewport information transmitted from the encoder or the transmission terminal may be provided to each operation in the decoder or the reception terminal.

Figure 25:
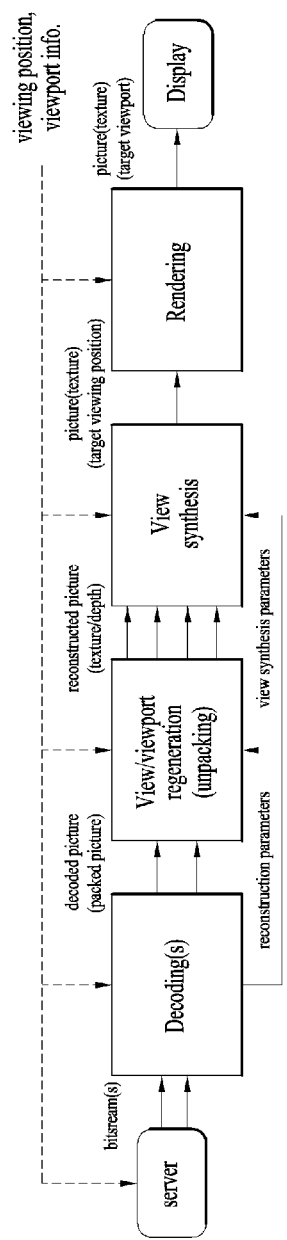
FIG. 25 illustrates a 3 DoF+ video reception method.

FIG. 25 illustrates a 3 DoF+ video reception method.

In the decoding, a bitstream containing data is received from the server and the data is decoded.

In the view/viewport regeneration, a decoded picture or a packed picture may be received, and the decoded picture may be unpacked using the reconstruction parameters and/or viewing position information, viewport information, and the like. In the view/viewport regeneration, an image of a specific viewing position for low-latency transmission/reception is reconstructed. The view/viewport regeneration may include a post-decoding process and view (or viewport) regeneration.

In the post-decoding process, unpacking for a full view may be performed, unpacking for a part of the viewport may be performed, and unpacking for related views may be performed.

In the view (or viewport) regeneration, view estimation may be performed with selected views (or decoded views), view reconstruction may be performed with metadata, and view reconstruction through patch/residual hole filling or the like may be performed. Alternatively, the view reconstruction may be performed without a patch.

In the view synthesis, a reconstructed picture including texture and depth may be received, and view synthesis may be performed on the reconstructed picture using the view synthesis parameter and/or viewing position information and viewport information. The view synthesis may provide view synthesis robust to coding/reconstruction errors, and may provide a view synthesizer optimized for a user viewport. In particular, it provides an optimization effect in terms of reduction of motion-to-photon delay. In addition, a module integrated with a renderer for low delay may be implemented, and thus only the region corresponding to the viewport may be synthesized. In other words, the view synthesis produces an image of a viewing position optimized for the user viewport.

In the rendering, a picture including a texture and/or target viewing position information may be received and be rendered using the viewing position information and/or viewport information.

The display may display the picture including the texture based on the target viewport information.

Each operation of the decoding, view/viewport regeneration, view synthesis, and/or rendering may use viewing position and viewport information. The viewing position information and viewport information may be received from the transmission terminal.

The decoding, view/viewport regeneration, view synthesis, rendering and/or display may be performed by the decoder, view/viewport regenerator, view synthesizer, rendering unit or renderer, display unit or displayer, and the like of the video reception device.

Accordingly, the video transmission device and the video reception device according to the embodiments of the present disclosure may provide a video transmission/reception system reflecting real-time motion. Further, the view/viewport regeneration process may reconstruct an image of a specific viewing position for low-latency transmission/reception, and the view synthesis may generate an image of a viewing position optimized for the user viewport.

Figure 26:
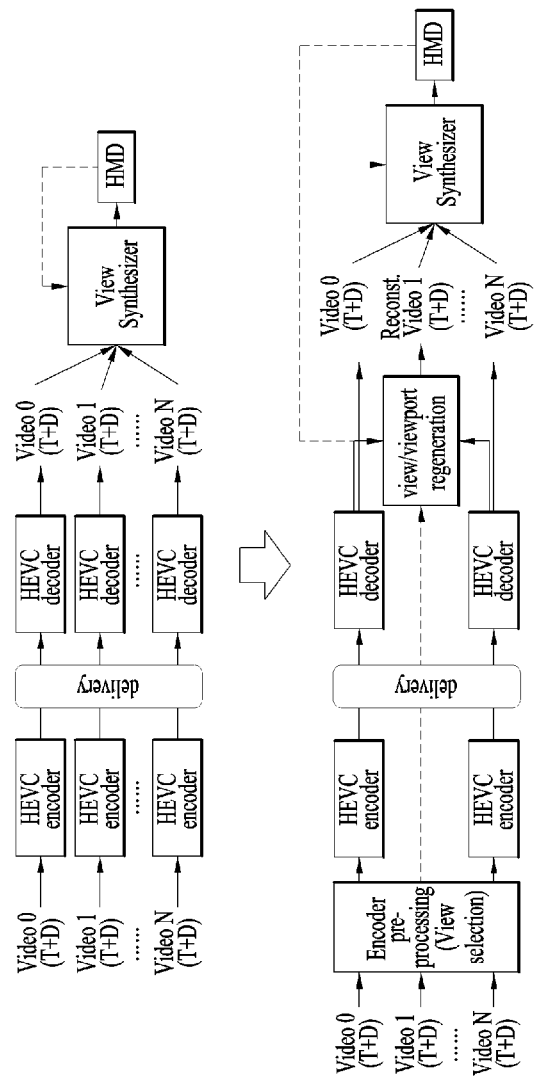
FIG. 26 illustrates preprocessing in which view selection is performed.

FIG. 26 illustrates preprocessing in which view selection is performed.

According to embodiments of the present disclosure, a video transmission device may include a plurality of HEVC encoders.

The encoders receive videos (including video 0 to video N) including texture (T) and depth (D), and encode N+1 videos.

Delivery refers to a process in which the video transmission device transmits data to a video reception device.

The decoders (HEVC decoders) receive and decode the N videos.

The view synthesizer synthesizes the N videos to generate and provide a synthesized video to a display unit or a display device. A head mounted display (HMD) device or the like may display the synthesized video for the user, and the view synthesizer may receive information related to the user's view from the HDM as feedback information.

According to embodiments of the present disclosure, the video transmission device and the video reception device may additionally include preprocessing and view/viewport regeneration for view selection.

In the encoder preprocessing, N videos including texture and depth may be received, and view selection may be performed. In the preprocessing, a view may be selected according to the characteristics of a video among the N videos. For example, views may be selected for two of the N video data. In the preprocessing, metadata related to the view selection may be generated while the view selection is performed. In the preprocessing, the metadata related to the view selection may be may transmitted to the video reception device. The metadata related to the view selection may be used in the view/viewport generator of the video reception device.

In the view selection, one or more video data are selected from among the plurality of received video data. In the operation of selecting a view, a view causing the least error through view synthesis may be selected.

The encoder encodes the video for which view selection has been performed.

The delivery refers to a process in which the video transmission device transmits an encoded video to the video reception device.

The decoder decodes the video for which the view selection has been performed.

In the view/viewport regeneration, the decoded video is received and a view and viewport is regenerated using the metadata related to the view selection, and the like. In the view/viewport regeneration, N videos may be generated or N or fewer videos may be generated. For example, the decoder may generate video 0 and video N including texture and depth by decoding two videos subjected to the view selection, and the view/viewport regeneration may reconstruct video 1 including texture and depth based on the metadata related to the view selection.

The view synthesizer may receive the decoded video and the regenerated videos and perform view synthesis. The view synthesizer generates an image for a viewing position that is optimized for the user viewport.

When there is additional information such as residual, an image of a specific viewing position may be estimated. Alternatively, an image of a viewing position may be estimated without additional information.

The HDM may display the image for the specific viewpoint. In addition, the HDM may provide the view synthesizer with information related to the user's view as feedback information.

Figure 27:
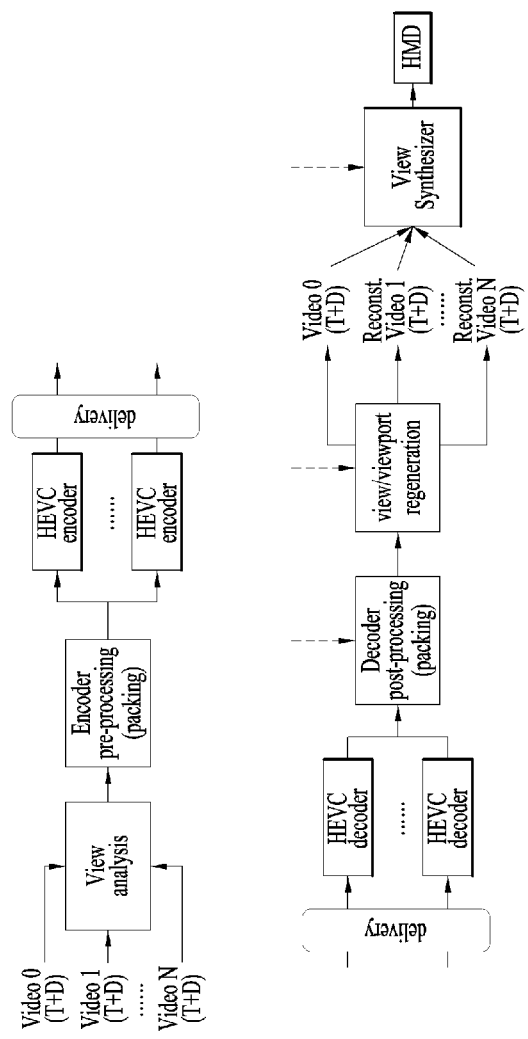
FIG. 27 illustrates preprocessing in which packing is performed.

FIG. 27 illustrates preprocessing in which packing is performed.

According to the embodiments of the present disclosure, the video transmission device may further perform view analysis and encoder preprocessing (packing).

The view analysis unit may receive N+1 videos including texture and depth, and analyze views for the videos. The view analysis unit analyzes the views to generate an image for a specific viewing position that is optimized for the user viewport. The view analysis may include view estimation and/or inter-position redundancy removal. A detailed process of the view analysis will be described with reference to FIGS. 28, 31.

The preprocessing (packing) receives the videos for which view analysis has been performed, and encodes the video. Here, the preprocessing may perform packing on the video. The view-analyzed videos may represent various viewing positions, textures, depths, and the like, and the packing may pack these pictures and generate an optimal picture capable of providing optimal encoding performance.

In other words, the packing receives a picture and configures a picture set corresponding to an optimal combination of a plurality of pictures based on the texture, depth, residual, and the like of the pictures. The packing may generate a packed picture with high coding efficiency. In the unpacking, a reverse process of the packing may be performed.

The encoder encodes video data including the packed pictures, and the encoded data is transmitted in the delivery.

The video reception device according to the embodiments of the present disclosure may further perform decoder post-processing (unpacking) and view/viewport regeneration.

The decoder receives the encoded data and decodes the data.

In the decoder post-processing (unpacking), a reverse process of the packing may be performed. In the unpacking, the packed pictures are unpacked. The unpacking may include unpacking for a full view, unpacking for a part of the viewport, and unpacking for related views, and may use viewing position information, viewport information, HDM feedback information and/or reconstruction parameters.

In the view/viewport regeneration, data including unpacked pictures may be received, and a video according to the view/viewport may be regenerated. In the view/viewport regeneration, video0, reconstructed video1, . . . , and reconstructed video N that include texture and depth may be generated. the view/viewport regeneration may use HDM feedback information.

The view synthesizer may synthesize (generate) an image of a specific viewing position that is optimized for the user viewport based on the regenerated videos.

The displayer (HDM) displays the synthesized view.

Figure 28:
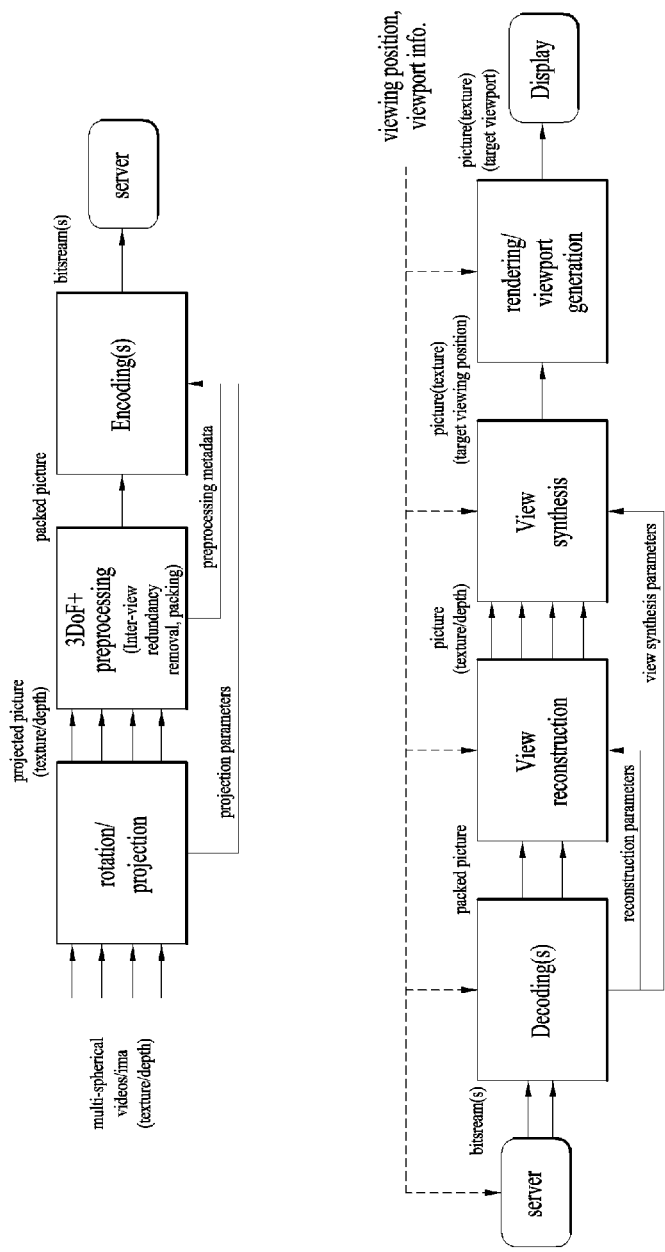
FIG. 28 illustrates an encoder and a decoder.

FIG. 28 illustrates an encoder and a decoder.

The video transmission device according to the embodiments of the present disclosure may be referred to as an encoder, and the video reception device according to the embodiments of the present disclosure may be referred to as a decoder.

The encoder may perform preprocessing, which includes rotation/projection, inter-view redundancy removal, and packing, and encoding. Each process may be performed by the encoder, rotation/projection unit, inter-view removal unit, packing unit, pre-processor, or the like of the video transmission device.

In the rotation/projection, multi-spherical videos/images are received. The multi-spherical videos/images may include texture and depth. In the rotation/projection, the multi-spherical videos/images may be rotated and/or projected, and parameters related to the projection may be generated. In this operation, projected pictures are generated.

In the preprocessing, inter-view redundancy of the projected pictures may be removed. Additionally, in the preprocessing, the projected pictures may be may packed. In the preprocessing, packed pictures and metadata related to the preprocessing are generated. In the preprocessing, a picture composed of one or more packing combinations is generated by optimizing a plurality of projected pictures.

In the encoding, data included in the packed pictures are encoded. Here, parameters related to the projection and metadata related to the preprocessing may be used. In the encoding, the encoded data is transmitted through a server in the form of a bitstream.

The decoder may perform decoding, view reconstruction, view synthesis, and rendering/viewport generation. Each process may be performed by the decoder, view reconstruction unit, view synthesizer, rendering/viewport generation unit, or the like of the video reception device.

In the decoding, a bitstream containing data is received from a server and the data is decoded. In the decoding, reconstruction parameters may be generated and a view synthesis parameter may be generated.

In the view reconstruction, the packed pictures and reconstruction parameters are received, and the views of the packed pictures are reconstructed based on the reconstruction parameters, viewing position information, and/or viewport information. In the view reconstruction, a plurality of pictures is generated by unpacking the packed pictured.

In the view synthesis, a picture including a texture and depth is received, and a picture based on a target viewing position is generated based on the view synthesis parameter, viewing position information, and/or viewport information.

In the rendering/viewport generation, a viewport is generated, a picture including the texture based on the target viewport is rendered based on the viewing position information and/or viewport information, and a video is rendered based on the viewport.

The display displays the picture including the texture for the target viewport.

Each process of the decoding, view reconstruction, view synthesis, and rendering/viewport generation may use viewing position information and/or viewing port information. The viewing position information and viewing port information may be received from the transmission terminal or may be provided from the display unit to each process of the reception terminal as feedback information.

Figure 29:
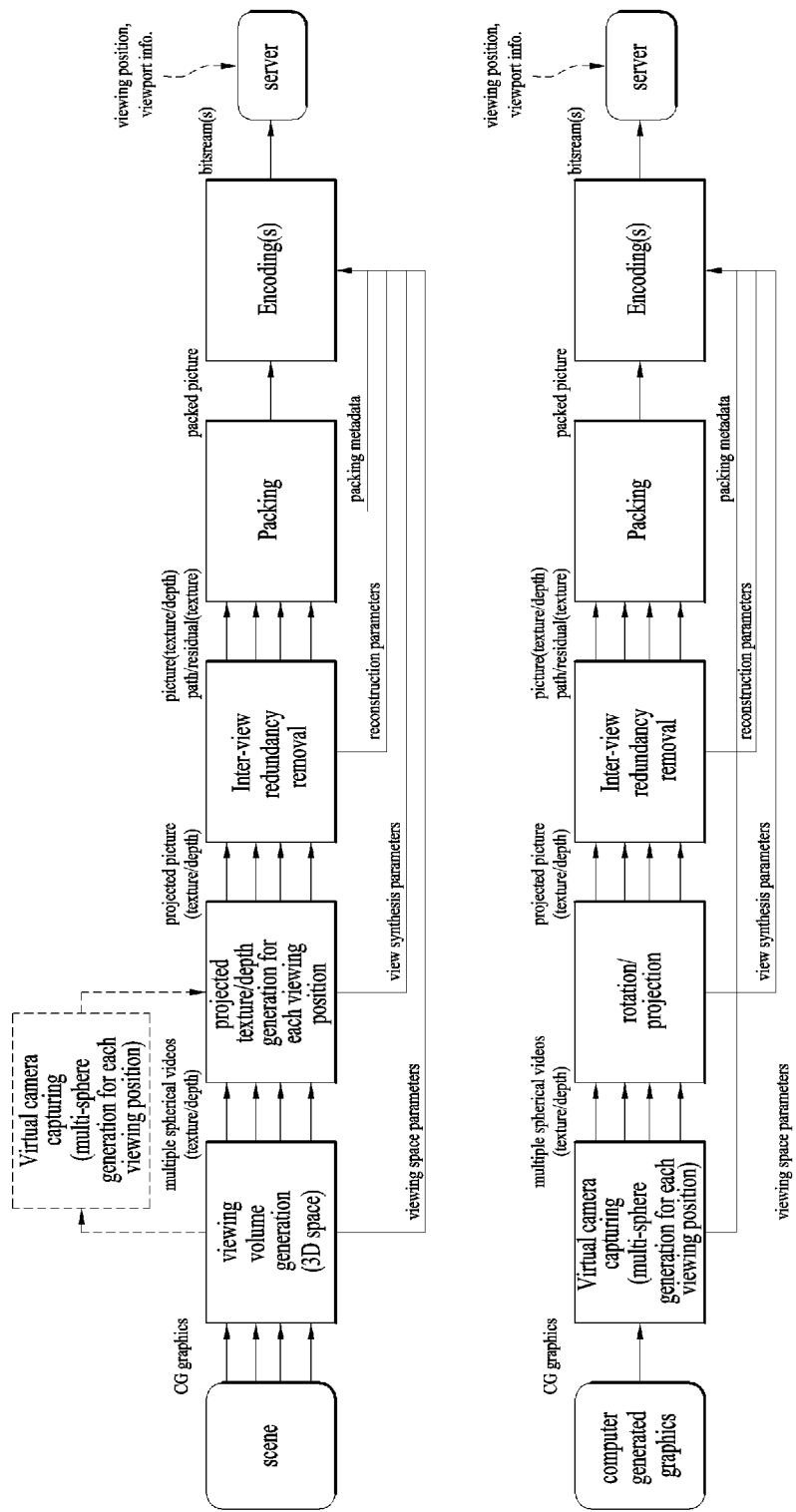
FIG. 29 illustrates a detailed configuration of the encoder.

FIG. 29 illustrates a detailed configuration of the encoder.

According to the embodiments of the present disclosure, the video transmission device (encoder) may perform the following operations.

Viewing volume generation acquires is performed to acquire 360 video data for multiple views from a target scene. In the viewing volume generation, scene information may be received in the form of CG, and a viewing volume may be generated in consideration of a 3D space for the scene. As a result, multiple spherical videos including a texture and depth are generated.

Here, the scene represents an image acquired from a camera, and CG represents an image acquired through preprocessing including computer graphics.

In the viewing volume generation, a viewing space parameter related to the viewing volume is generated. The viewing volume refers to a space that supports 3 DoF+. This operation synthesizes an image of a virtual view in a 3D space through processing including computer graphics, rather than employing the original images captured by the camera, and creates a 3 DoF+ image from the synthesized image.

Virtual camera capturing may be performed create a multi-sphere for each viewing position. Virtual camera capture information may be generated based on the viewing volume. The virtual camera capturing may be optionally performed.

Projected texture/depth generation for each viewing position is performed to creates a projected picture including texture/depth for each viewing position and to create a view synthesis parameter for synthesizing the projected pictures.

Inter-view redundancy removal is performed to remove inter-view redundancy between the views for the projected pictures to generate a picture including a texture and depth. The inter-view redundancy removal generates an optimal picture in consideration of a patch and a residual for the texture, and generates reconstruction parameters for reconstructing the picture.

Packing is performed to generate a packed picture by packing pack a plurality of pictures and to generate packing metadata related to the packing of the pictures.

Encoding is performed to encode the packed picture. In the encoding, data included in the picture is encoded based on the viewing space parameter, view synthesis parameter, reconstruction parameters, and/or packing metadata generated in the above-described operations.

The encoded data is transmitted from the video transmission device (encoder) to the video reception device (decoder) in the form of a bitstream through a server. Here, viewing position information and/or viewport information may be transmitted together.

Each operation of the above-described video transmission device may be performed by a viewing volume generator, a virtual camera capturer, a projector, an inter-view redundancy remover, a packing unit, an encoder, or the like included in the video transmission device.

According to embodiments of the present disclosure, the video transmission device may perform the following operations.

Virtual camera capturing is performed to receive computer-generated graphic data and generate multi-spherical data for each viewing position. The virtual camera capturing generates multiple spherical videos including a texture and depth, and generates a viewing space parameter related to the multiple spherical videos.

Rotation/projection is performed to rotate and/or project the plurality of spherical videos including a texture and depth to generate projected pictures. Also, a view synthesis parameter for view synthesis of the pictures is generated.

Inter-view redundancy removal is performed to remove redundancy between the views for the projected pictures. The inter-view redundancy removal generates a inter-view redundancy removed picture optimized for a patch/residual (texture), and generates a reconstruction parameter for reconstructing the picture.

Packing is performed to pack a plurality of pictures to generate an optimal picture. The packing generates packing metadata indicating the packed picture.

Encoding is performed to encode the packed picture. The encoding encodes data included in the packed picture based on the viewing space parameter, the view synthesis parameter, the reconstruction parameter, and/or packing metadata generated in the above-described operations.

The encoded data is transmitted from the video transmission device (encoder) to the video reception device (decoder) in the form of a bitstream through a server. Here, viewing position information and/or viewport information may also be transmitted together.

Each operation of the above-described video transmission device may be performed by the virtual camera capturer, the rotator/projector, the inter-view redundancy remover, the packing unit, the encoder, or the like.

Figure 30:
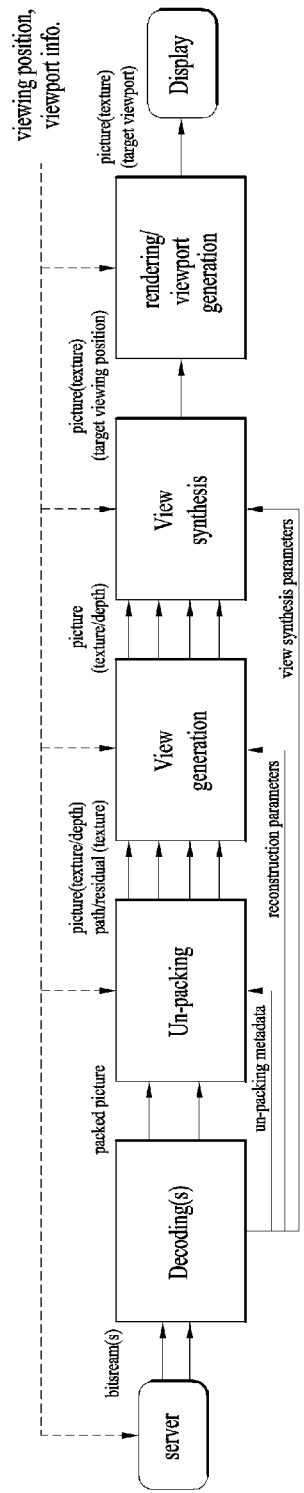
FIG. 30 illustrates a detailed configuration of the decoder.

FIG. 30 illustrates a detailed configuration of the decoder.

According to embodiments of the present disclosure, the video reception device (decoder) may perform the following operations.

The video reception device may receive data from the video transmission device through the server.

Decoding is performed to decode data included in a bitstream. In the decoding, a packed picture may be generated by decoding the data. In addition, unpacking metadata for unpacking the packed picture from the data included in the bitstream, reconstruction parameters for reconstructing a picture, and view synthesis parameters for synthesizing a view for the picture may be generator.

Unpacking is performed to generate a plurality of pictures by unpacking one or more packed pictures. The unpacked pictures are pictures which include texture and depth, and are optimized from a patch/residual (texture) perspective. In the unpacking, the packed picture is unpacked based on the unpacking metadata.

View generation is performed to generate a view for the unpacked pictures. The view generation generates a view from a picture based on the reconstruction parameters.

View synthesis is performed to receive pictures including the generated view and generate a picture for a texture based on the target viewing position. The view synthesis generates (synthesizes) a picture based on the view synthesis parameters.

Rendering/viewport generation is performed to generate a viewport for the synthesized view, and render a picture for the texture based on the target viewport.

Display is performed to display the picture for the target viewport.

Each operation of the video reception device described above may additionally use viewing position information and/or viewport information received from the encoder and/or feedback information received from the display unit.

Each operation of the video reception device described above may be performed by the decoder, the unpacking unit, the view generator, the view synthesizer, the rendering/viewport generator, or the like.

According to embodiments of the present disclosure, the video transmission device and the video reception device provide a 3 DoF+ video transmission/reception system reflecting real-time motion.

According to embodiments of the present disclosure, the video transmission method and the video reception method may reduce the load to the receiver and the latency of the receiver. Specifically, the process of view estimation and reconstruction removes inter-view redundancy. For example, 3D prediction & patch and 2D prediction & patch may be used. In addition, pictures having different textures, depths, patches, and the like for multiple viewing positions may be packed to generate a picture of an optimum or minimum size with high coding efficiency. In addition, an image optimized for the receiver may be generated. For example, a layered patch may be used, which may allow the view generation and the view synthesis to be performed simultaneously. In addition, an image for change in viewing position with a low delay may be generated. For example, MCTS may be used to group and process the same viewing direction.

Additionally, according to the embodiments of the present disclosure, the video transmission method and the video reception method may generate a multi-view 3 DoF+ image. Specifically, the view synthesizer is robust to view generation errors, and thus the performance of the view synthesizer may be improved. In addition, the view synthesizer is viewport-dependent and may be integrated with the renderer to optimize the performance of the view synthesizer.

The video transmission device and the video reception device according to the embodiments may generate and use the following metadata.

Unpacking metadata includes configuration information about decoding. In the decoding, data is decoded, and configuration information about the configuration of a decoded picture is generated as the unpacking metadata. The unpacking metadata may include attribute information about the texture, patch, residual, depth, overlay, etc. included in the picture. The unpacking metadata may include attribute information about each part of the packed picture, information indicating a viewing position that each part of the packed picture corresponds to, and information indicating a position which each part of the packed picture corresponds to on the projected picture. The unpacking metadata may also include spatial scaling information, transformation information, and brightness scaling information for the decoded picture.

Reconstruction parameters may be used as view generation parameters. After the unpacking, the view generation is performed to combine a texture, a patch, and a residual to generate a texture or a picture including the texture. Accordingly, the reconstruction parameters may include information related to a combination of a texture, a patch, and a residual for view synthesis of pictures. In addition, since the view generation may additionally perform view estimation, the reconstruction parameters may include information related to the view estimation. Specifically, the reconstruction parameters may include information indicating the viewing position(s) whose texture and depth are used for prediction, and information indicating a method for view estimation (e.g., type information such as 3D prediction, 2D prediction, and view synthesizer). Here, the 3D prediction represents a method of re-projecting a picture in 3D space. For example, it represents a method of wrapping the picture in the viewing position B. The 2D prediction represents a method of performing motion estimation on a picture in a projection format. For example, it represents object/viewing direction-based motion estimation. The reconstruction parameters may include information indicating a method of processing the patch/residual.

View synthesis synthesizes a view of a picture including a texture and depth using a signal (or information) about each viewing position, and thus a view synthesis parameter is required. Specifically, the view synthesis parameter may include information indicating a texture and depth of a video, and information about a current video. For example, the information about the current video may represent a viewpoint and a viewing position. The view synthesis parameter may include information about a movable video. For example, it may represent available viewpoints and viewing space information. The view syntax parameter may include information for view synthesis, such as information indicating the position of the source viewing position, information indicating presence or absence of depth, information indicating the near/far range of the depth, information indicating presence or absence of a reconstructed view, information indicating a quality, information indicating a resolution, and information indicating camera parameters.

In this specification, the above-described metadata may be referred to by various terms such as signaling information, first signaling information, and first information.

Figure 31:
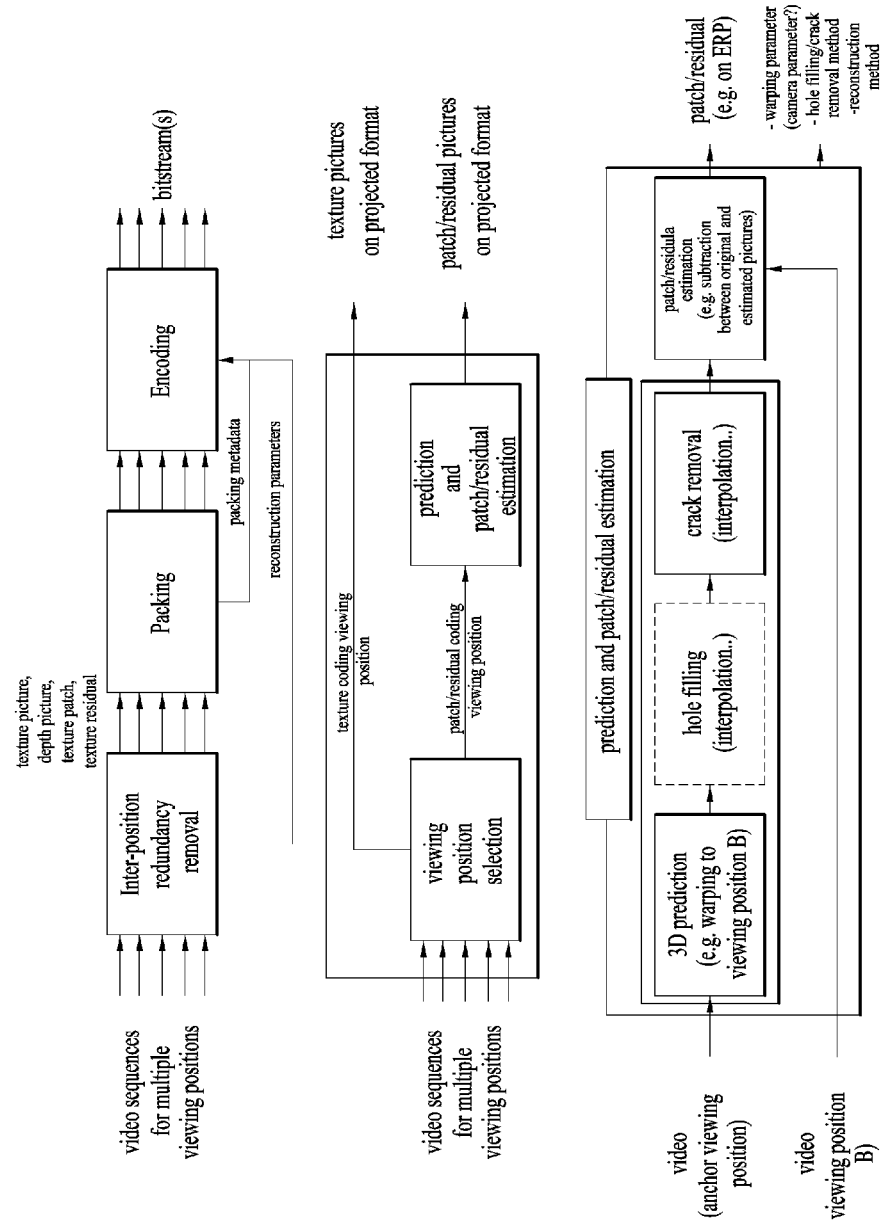
FIG. 31 illustrates an encoder.

FIG. 31 illustrates an encoder.

According to embodiments of the present disclosure, the video transmission device (encoder) may further perform inter-position redundancy removal, packing, and/or encoding. Each process of the video transmission device may be performed by the inter-position redundancy remover, the packing unit, and/or the encoder.

In the inter-position redundancy removal, video sequences for multiple views are received and inter-position redundancy of the video sequences is removed. The inter-position redundancy removal generates reconstruction parameters related to the redundancy removal. The inter-position redundancy removal removes inter-position redundancy of video sequences to generate a picture including a texture, a picture including depth, a patch including a texture, a residual including a texture, and the like.

In the inter-position redundancy removal, a sequence including a video (or image) of a plurality of viewing positions is received, and redundancy in the video between adjacent viewing positions of the plurality of viewing positions is removed. A texture picture, depth picture, texture patch, and texture residual for the viewing position from which redundancy has been removed are generated. In addition, when a texture, a depth, a patch, and the like have been transmitted for a specific viewing position, transmission of a texture, a depth picture, and the like may not be performed.

In the packing, pictures are received and packed. In the packing, optimal picture(s) may be generated by packing the pictures. The packing generates packing metadata related to packing of the pictures.

In the encoding, the pictures are encoded. Data included in the pictures are encoded based on the reconstruction parameters and/or packing metadata. The encoded data is transmitted to the video reception device in the form of a bitstream.

The inter-position redundancy removal may include viewing position selection and prediction and patch/residual estimation.

In the viewing position selection, video sequences for multiple views are received, and a target viewing position (or a specific viewing position) is selected from among the multiple views. Here, the viewing position selection generates information indicating the selected viewing position, and generates patch/residual setting or attribute information about the selected target viewing position. In addition, texture pictures on the projected format are generated based on the texture coding viewing position information.

Here, since the result of the viewing position selection is a texture/depth picture, an anchor view is selected.

In the prediction and patch/residual estimation, patch/residual attribute information and/or viewing position information generated in the viewing position selection are received. A target viewing position is predicted and a patch/residual is estimated to generate a patch/residual picture on a projected format. In other words, after the viewing position selection, a video for an original first viewing position may be predicted based on a second viewing position which is a target of the estimation, and the patch/residual between the first viewing position and the second viewing position may be estimated.

Specifically, the prediction patch/residual estimation includes 3D prediction, hole filling, crack removal, and patch/residual estimation.

In the 3D prediction, a video for an anchor viewing position is received. in the 3D prediction, 3D prediction of the video for the anchor viewing position is performed for a specific viewing position. For example, wrapping for viewing position B may be applied to the video for the anchor viewing position. Here, the anchor viewing position may represent one viewing position among multiple viewing positions, and may represent a viewing position including important data.

In the hole filling, a hole that may be produced in the 3D prediction may be filled. A hole between the video for the anchor viewing position and the 3D predicted video for another viewing position may be filled. For example, the hole may be filled using a scheme such as interpolation. The hole filling may be performed optionally.

In the crack removal, cracks that may be produced in the 3D predictions are removed. For example, the cracks may be removed using a scheme such as interpolation.

In the patch/residual estimation, the video for viewing position B and the predicted picture are received, and a patch/residual is generated through subtraction between the original picture and the estimated picture. That is, a patch/residual that may occur due to a difference between a picture from which the video for the anchor viewing position is predicted and the video for the viewing position B may be estimated.

As a result, the prediction patch/residual estimation may generate a patch and a residual (for, for example, ERP) for a video between viewing positions. In addition, the prediction patch/residual estimation may generate the following metadata or signaling information. Specifically, it may include a wrapping parameter, a camera parameter, information indicating a hole filling and crack removal method, and information indicating a reconstruction method.

Therefore, the encoder according to the embodiments of the present disclosure may only need to transmit the patch and/or residual for viewing position B and signaling information related thereto, rather than transmitting the entire video of a specific viewing position, for example, viewing position B. Thereby, 3 DoF+ video may be efficiently processed.

Figure 32:
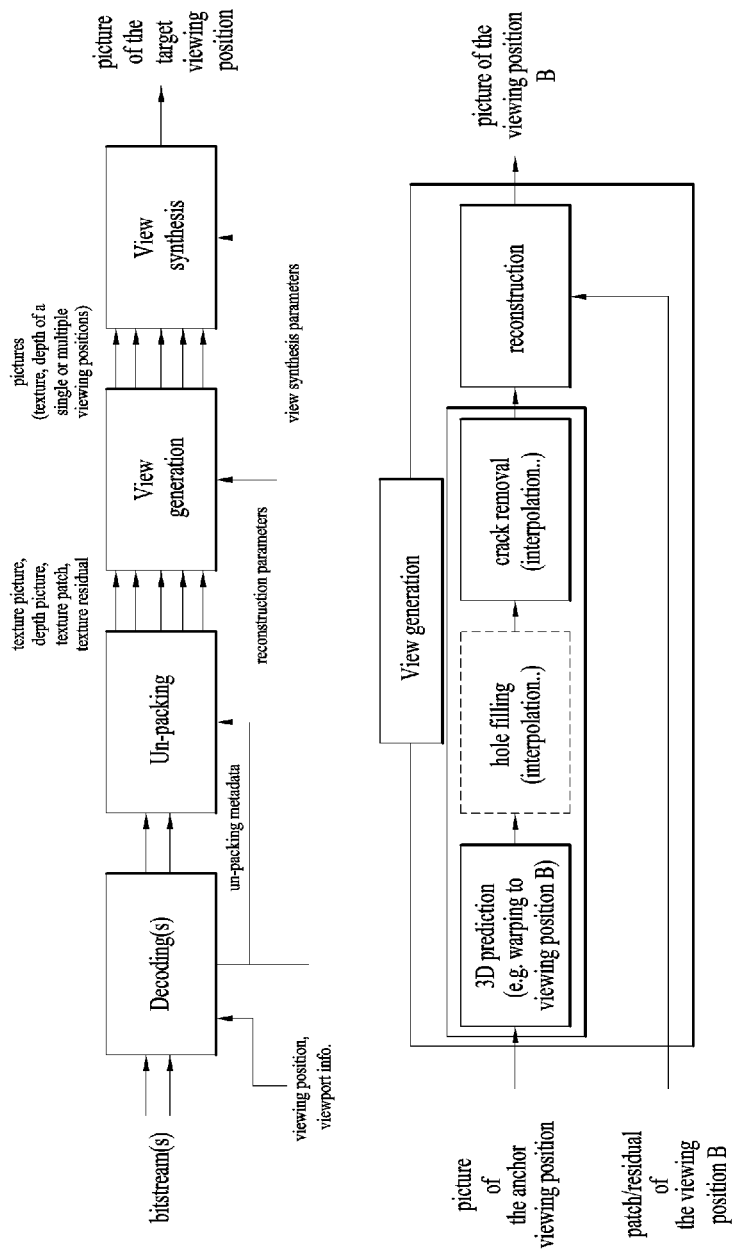
FIG. 32 illustrates a decoder.

FIG. 32 illustrates a decoder.

According to embodiments of the present disclosure, the video reception device (decoder) may further perform decoding, un-packing, view generation, and/or view synthesis. Each operation of the video reception device may be performed by the decoder, unpacking unit or unpacker, view generator, view synthesizer, or the like of the video reception device.

In the decoding, a bitstream is received from a video transmission device, and data included in the bitstream is decoded. In the decoding, the data may be decoded based on viewing position information and viewport information. The decoding may generate unpacking metadata including information about the unpacking, reconstruction parameters including information necessary for the view generation, and view syntax parameters including information necessary for the view synthesis.

In the un-packing, the decoded data or decoded pictures are received, the packed pictures are unpacked. In the un-packing, the packed pictures are unpacked using the unpacking metadata, and a texture picture, a depth picture, a texture patch, and a texture residual are generated.

In the view generation, the texture picture, depth picture, texture patch, and texture residual are received, and a view for one or more viewing positions is synthesized using the reconstruction parameters. In the view generation, a picture including a texture and depth for single or multiple views is generated.

In the view synthesis, a view for the view-generated picture is synthesized based on the view synthesis parameter. The view synthesis finally generates a picture of a target viewing position or a specific viewing position.

Specifically, the view generation may include 3D prediction, hole filing, crack removal, and reconstruction.

In the 3D prediction, a picture of an anchor viewing position is received and 3D prediction is performed thereon. For example, the prediction may be performed by wrapping the picture in the viewing position B.

In the hole filing, a hole that may be produced in the process of applying the prediction to the picture of the anchor viewing position may be filled. For example, the hole may be filled using a scheme such as interpolation. The hole filling may be performed optionally.

In the crack removal, cracks that may be produced in the 3D prediction are removed. For example, the cracks may be removed using a scheme such as interpolation.

In the reconstruction, a picture of the viewing position B may be generated using the picture of the anchor viewing position obtained through the prediction and the patch and residual of the viewing position B.

Figure 33:
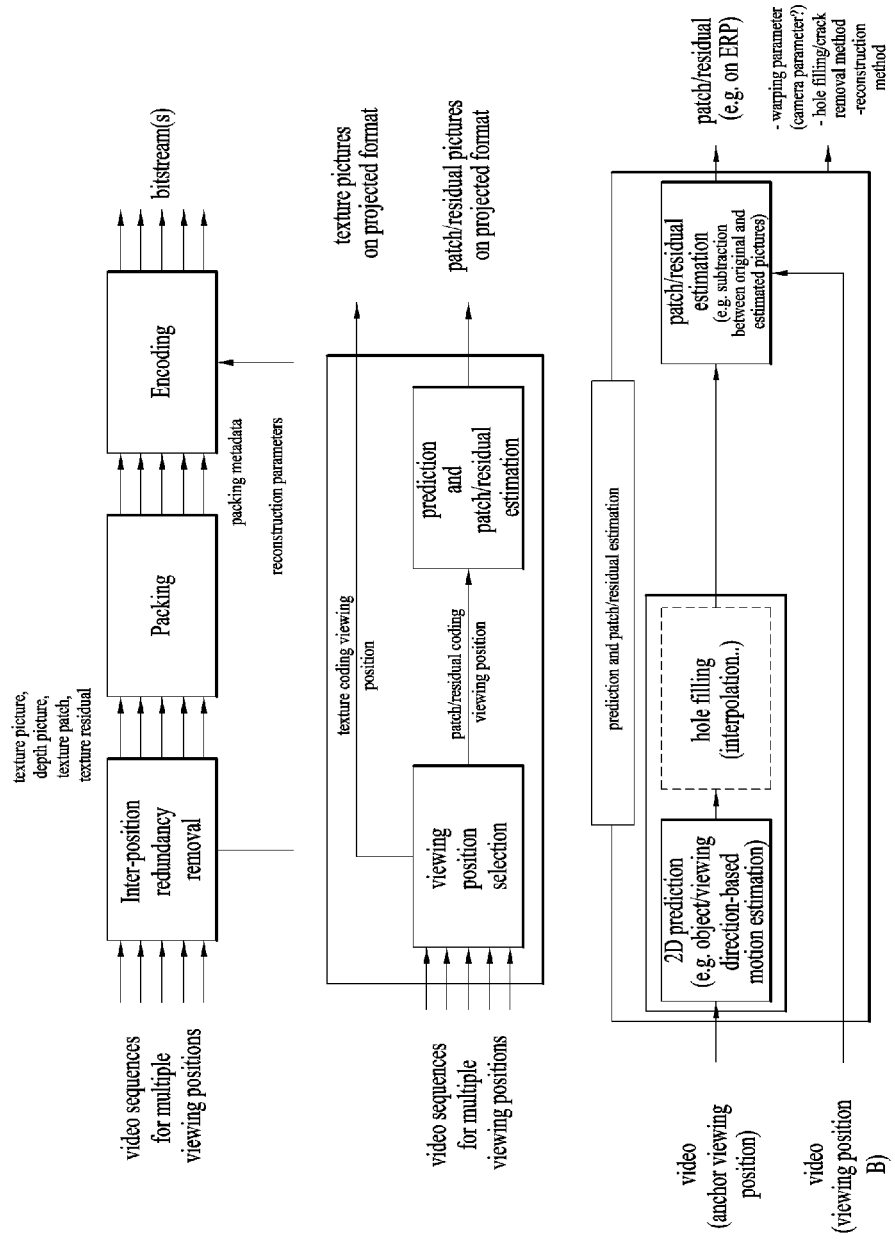
FIG. 33 illustrates an encoder.

FIG. 33 illustrates an encoder.

According to embodiments of the present disclosure, the video transmission device (encoder) may further perform inter-position redundancy removal, packing, and/or encoding. Each process of the video transmission device may be performed by the inter-position redundancy remover, the packing unit, and/or the encoder.

In the inter-position redundancy removal, video sequences for multiple views are received and inter-position redundancy of the video sequences is removed. The inter-position redundancy removal generates reconstruction parameters related to the redundancy removal. The inter-position redundancy removal removes inter-position redundancy of video sequences to generate a picture including a texture, a picture including depth, a patch including a texture, a residual including a texture, and the like.

In the packing, pictures are received and packed. In the packing, optimal picture(s) may be generated by packing the pictures. The packing generates packing metadata related to packing of the pictures.

In the encoding, the pictures are encoded. Data included in the pictures are encoded based on the reconstruction parameters and/or packing metadata. The encoded data is transmitted to the video reception device in the form of a bitstream.

The inter-position redundancy removal may include viewing position selection and prediction and patch/residual estimation.

In the viewing position selection, video sequences for multiple views are received, and a target viewing position (or a specific viewing position) is selected from among the multiple views. Here, the viewing position selection generates information indicating the selected viewing position, and generates patch/residual setting or attribute information about the selected target viewing position. In addition, texture pictures on the projected format are generated based on the texture coding viewing position information.

In the prediction and patch/residual estimation, patch/residual attribute information and/or viewing position information generated in the viewing position selection are received. A target viewing position is predicted and a patch/residual is estimated to generate a patch/residual picture on a projected format. In other words, after the viewing position selection, a video for an original first viewing position may be predicted based on a second viewing position which is a target of the estimation, and the patch/residual between the first viewing position and the second viewing position may be estimated.

In the prediction, a viewing position is used to estimate information about another viewing position. In other words, the prediction searches for redundant information. Since the estimable information may be considered to be reproducible in the decoder, the encoder or the transmission terminal does not transmit the estimable information to the decoder or the reception terminal, but transmits a part (the residual) that is not estimable. Thereby, redundant information may be removed.

Specifically, the prediction further includes patch/residual estimation, 2D prediction, hole filling, and patch/residual estimation.

In the 2D prediction, 2D prediction is applied to the video for the anchor viewing position. For example, the 2D prediction may be performed using an object/viewing direction-based motion estimation scheme. The video for the anchor viewing position is 2D predicted based on the object/viewing direction.

The 2D prediction projects the video onto a 2D image. On the other hand, the 3D prediction performs projection based on the position difference in 3D space.

In the hole filling, a hole produced in the prediction may be filled. A hole between the video for the anchor viewing position and the 2D predicted video for the object/viewing direction may be filled. For example, the hole may be filled using a scheme such as interpolation. The hole filling may be performed optionally.

In the patch/residual estimation, the video for the viewing position B and the predicted picture are received, and a patch/residual is generated through a subtraction between the original picture and the estimated picture.

As a result, the prediction patch/residual estimation may generate a patch and a residual (for, for example, ERP) for a video between viewing positions. In addition, the prediction patch/residual estimation may generate the following metadata or signaling information. Specifically, it may include a wrapping parameter, a camera parameter, information indicating a hole filling and crack removal method, and information indicating a reconstruction method.

Therefore, the encoder according to the embodiments of the present disclosure may only need to transmit the patch and/or residual for viewing position B and signaling information related thereto, rather than transmitting the entire video of a specific viewing position, for example, viewing position B. Thereby, 3 DoF+ video may be efficiently processed.

Figure 34:
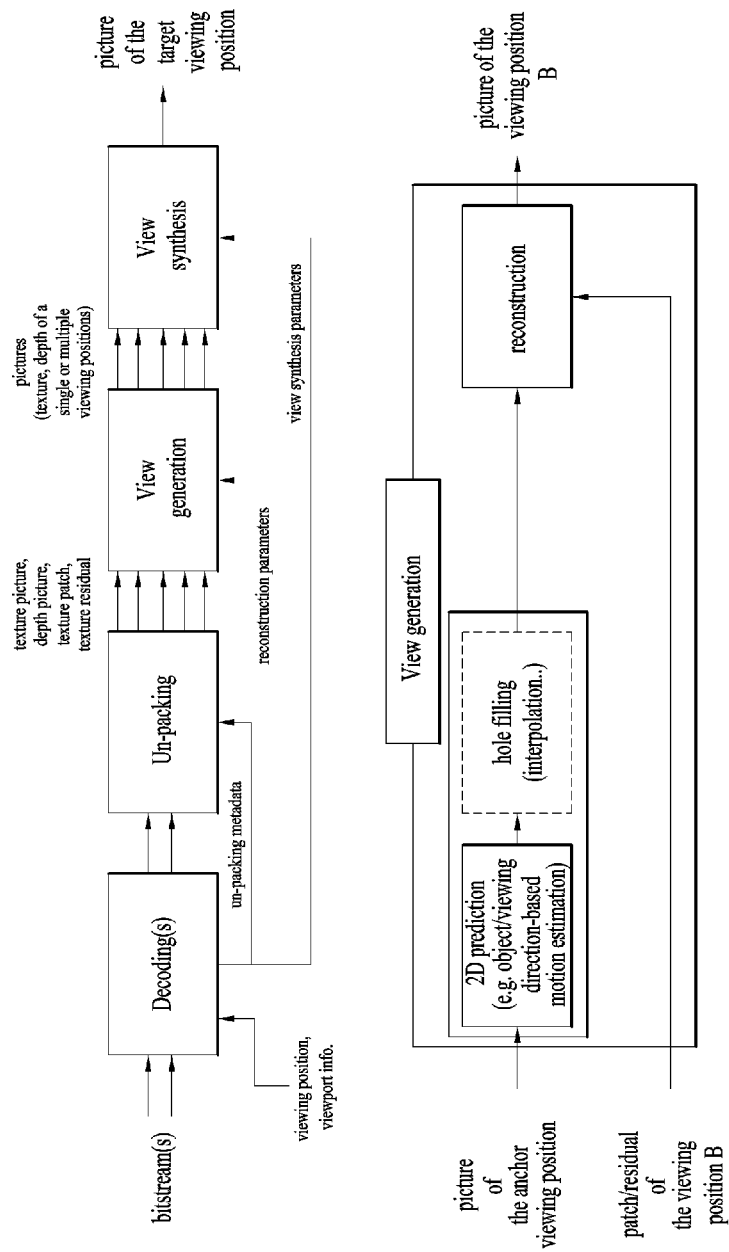
FIG. 34 illustrates a decoder.

FIG. 34 illustrates a decoder.

According to embodiments of the present disclosure, the video reception device (decoder) may further perform decoding, un-packing, view generation, and/or view synthesis. Each operation of the video reception device may be performed by the decoder, unpacking unit or unpacker, view generator, view synthesizer, or the like of the video reception device.

In the decoding, a bitstream is received from a video transmission device, and data included in the bitstream is decoded. In the decoding, the data may be decoded based on viewing position information and viewport information. The decoding may generate unpacking metadata including information about the unpacking, reconstruction parameters including information necessary for the view generation, and view syntax parameters including information necessary for the view synthesis.

In the un-packing, the decoded data or decoded pictures are received, the packed pictures are unpacked. In the un-packing, the packed pictures are unpacked using the unpacking metadata, and a texture picture, a depth picture, a texture patch, and a texture residual are generated.

In the view generation, the texture picture, depth picture, texture patch, and texture residual are received, and a view for one or more viewing positions is synthesized using the reconstruction parameters. In the view generation, a picture including a texture and depth for single or multiple views is generated.

In the view synthesis, a view for the view-generated picture is synthesized based on the view synthesis parameter. The view synthesis finally generates a picture of a target viewing position or a specific viewing position.

Specifically, the view generation may include 2D prediction, hole filing, and reconstruction.

In the 2D prediction, 2D prediction is applied to the video for the anchor viewing position. For example, the 2D prediction may be performed using an object/viewing direction-based motion estimation scheme. The video for the anchor viewing position is 2D predicted based on the object/viewing direction.

In the hole filing, a hole that may be produced in the process of applying the prediction to the picture of the anchor viewing position may be filled. For example, the hole may be filled using a scheme such as interpolation. The hole filling may be performed optionally.

In the reconstruction, a picture of the viewing position B may be generated using the picture of the anchor viewing position obtained through the prediction and the patch and residual of the viewing position B.

Figure 35:
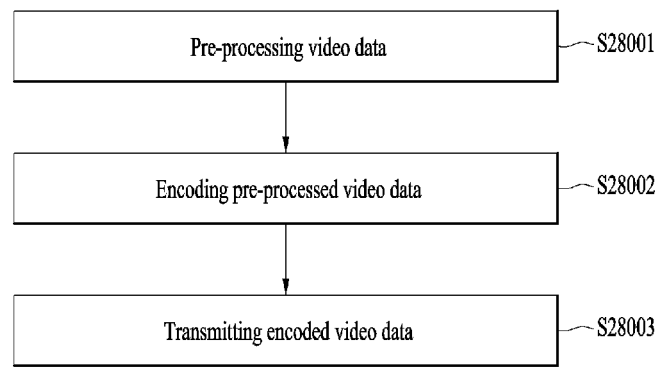
FIG. 35 illustrates a video transmission method.

FIG. 35 illustrates a video transmission method.

According to the embodiments of the present disclosure, the video transmission method includes preprocessing video data (S28001), encoding the preprocessed video data (S28002), and/or transmitting the encoded video data (S28003). Here, each of the operations may be processed by each component of the video transmission device shown in FIG. 23.

Figure 36:
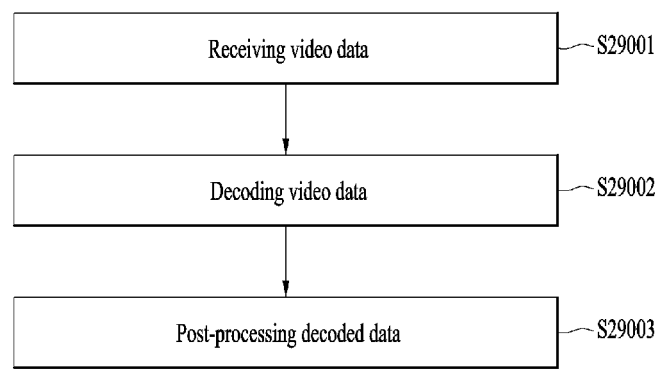
FIG. 36 illustrates a video reception method.

FIG. 36 illustrates a video reception method.

According to the embodiments of the present disclosure, the video reception method includes receiving video data (S29001), decoding the video data (S29002), and/or post-processing the decoded data (S29003). Here, each of the operations may be processed by each component of the video reception device shown in FIG. 22.

Each part, module, or unit described above may be software, a processor, or a hardware part that executes successive procedures stored in a memory (or storage unit). The respective operations described in the embodiments above may be performed by software, processors or hardware parts. Each module/block/unit described in the examples above may operate as a processor, software, or hardware. In addition, the above-mentioned methods of the present disclosure may be realized by code. The code may be written in a recoding medium readable by a processor so that the code may be read by the processor provided by the apparatus.

Although the description of the present disclosure is explained with reference to each of the accompanying drawings for clarity, it is possible to design new examples by merging the examples shown in the accompanying drawings with each other. If a recording medium readable by a computer, in which programs for executing the examples mentioned in the foregoing description are recorded, is designed by those skilled in the art, it may fall within the scope of the appended claims and their equivalents.

The devices and methods according to the present disclosure may be non-limited by the configurations and methods of the examples mentioned in the foregoing description. The examples mentioned in the foregoing description may be configured in a manner of being selectively combined with one another entirely or in part to enable various modifications.

In addition, a method according to the present disclosure may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the disclosure has been described with reference to the exemplary examples, those skilled in the art will appreciate that various modifications and variations can be made in the present disclosure without departing from the spirit or scope of the disclosure described in the appended claims. Such modifications are not to be understood individually from the technical idea or viewpoint of the present disclosure It will be appreciated by those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

In this specification, both an apparatus invention and a method invention are mentioned, and the descriptions of both the apparatus and method inventions may be applied to complement each other.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Various examples have been described in the best mode for carrying out the disclosure.

The present invention is used in a series of VR related fields.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A 360 video data transmission device comprising:
a pre-processor configured to process 360 video data and generate metadata;
an encoder configured to encode the pre-processed 360 video data;
an encapsulator configured to encapsulate the encoded 360 video data and the metadata; and
a transmitter configured to transmit the encapsulated 360 video data,
wherein the pre-processor is further configured to:
project the 360 video data,
generate a packed picture and metadata related to the packed picture,
analyze multiple 360 video data for multiple views, and
perform inter-position redundancy removal for the 360 video data,
wherein the inter-position redundancy removal includes (i) selecting at least one of the multiple 360 video data for a specific view of the multiple views and (ii) generating patches and residual pictures based on estimation of a patch and residual, and
wherein the metadata includes information for reconstruction of a view.

2. The device of claim 1, wherein the inter-position redundancy removal includes 3D prediction, hole filling, and crack removal for the 360 video data.

3. A 360 video data transmission method comprising:
pre-processing 360 video data;
encoding the pre-processed 360 video data;
encapsulating the encoded 360 video data; and
transmitting the encapsulated 360 video data,
wherein the pre-processing the 360 video data further includes:
projecting the 360 video data,
generating a packed picture and metadata related to the packed picture,
analyzing multiple 360 video data for multiple views, and
performing inter-position redundancy removal for the 360 video data,
wherein the inter-position redundancy removal includes (i) selecting at least one of the multiple 360 video data for a specific view of the multiple views and (ii) generating patches and residual pictures based on estimation of a patch and residual, and
wherein the metadata includes a reconstruction parameter and a synthesis parameter for a view.

4. A 360 video data device comprising:
a receiver configured to receive 360 video data and metadata that includes a reconstruction parameter and a synthesis parameter for a view;
a decapsulator configured to decapsulate the 360 video data;
a decoder configured to decode the decapsulated 360 video data; and
a post-processor configured to:
post-process the decoded 360 video data,
unpack packed pictures included in the decoded 360 video data,
generate reconstructed 360 video data based on the reconstruction parameter,
synthesize the reconstructed 360 video data with the decoded 360 video data based on the synthesis parameter, and
predict the 360 video data for a viewing position.

5. The device of claim 4,
wherein the post-processor is configured to:
generate reconstructed 360 video data based on at least one of viewing position information and viewport information, and
synthesize the reconstructed 360 video data with the decoded 360 video data based on at least one of the viewing position information and the viewport information.

6. A 360 video data reception method comprising:
receiving 360 video data and metadata that includes a reconstruction parameter and a synthesis parameter for a view;
decapsulating the 360 video data;
decoding the decapsulated 360 video data; and
post-processing the decoded 360 video data,
wherein post-processing the decoded 360 video data further includes:
unpacking a packed picture included in the decoded 360 video data,
generating reconstructed 360 video data based on the reconstruction parameter,
synthesizing the reconstructed 360 video data with the decoded 360 video data based on the synthesis parameter, and
predicting the 360 video data for a viewing position,
wherein generating the reconstructed 360 video data is based on at least one of viewing position information and viewport information, and
wherein synthesizing the reconstructed 360 video data is based on at least one of the viewing position information and the viewport information.

7. The method of claim 6, further comprising:
generating a picture including a texture and a depth, and
generating a picture for a target viewing position from the unpacked picture.

* * * * *